US012550805B2

(12) United States Patent
Singh et al.

(10) Patent No.: US 12,550,805 B2
(45) Date of Patent: Feb. 17, 2026

(54) METHODS AND SYSTEMS TO DETERMINE MATERIAL TRANSFER LOCATIONS

(71) Applicant: Deere & Company, Moline, IL (US)

(72) Inventors: Rana Shakti Singh, Kaimur (IN); Stephen R. Corban, Geneseo, IL (US); Nathan R. Vandike, Geneseo, IL (US); Federico Pardina-Malbran, Fort Collins, CO (US); Corey A. Akers, Highlands Ranch, CO (US); Ryan C. Russell, Orion, IL (US)

(73) Assignee: Deere & Company, Moline, IL (US)

( * ) Notice: Subject to any disclaimer, the term of this patent is extended or adjusted under 35 U.S.C. 154(b) by 98 days.

(21) Appl. No.: 18/400,177

(22) Filed: Dec. 29, 2023

(65) Prior Publication Data

US 2025/0212713 A1 Jul. 3, 2025

(51) Int. Cl.
*A01B 69/04* (2006.01)
(52) U.S. Cl.
CPC .................................. *A01B 69/008* (2013.01)
(58) Field of Classification Search
CPC ....................................................... A01B 69/008
See application file for complete search history.

(56) References Cited

U.S. PATENT DOCUMENTS

| 7,756,624 | B2 | 7/2010 | Diekhans et al. |
| 10,159,191 | B2 | 12/2018 | Andrios |
| 2020/0128734 | A1* | 4/2020 | Brammeier ........ A01D 41/1275 |
| 2022/0113725 | A1* | 4/2022 | Vandike ............. G01C 21/3848 |
| 2022/0197302 | A1 | 6/2022 | McClelland et al. |
| 2023/0124026 | A1* | 4/2023 | Hansen ................ G05D 1/0274 |
| | | | 701/25 |
| 2024/0032474 | A1 | 2/2024 | Ritter |
| 2024/0049633 | A1 | 2/2024 | Vandike et al. |

* cited by examiner

*Primary Examiner* — Navid Z. Mehdizadeh
*Assistant Examiner* — Oliver Tan
(74) *Attorney, Agent, or Firm* — Kelly, Holt & Christenson; Joseph R. Kelly

(57) ABSTRACT

A material transfer operation system includes one or more processors and memory storing instructions that, when executed by the one or more processors, configure the one or more processors to identify a material transfer machine material transfer route indicative of a route along which a material transfer machine is to conduct a material transfer operation; identify a material receiving machine material transfer route indicative of a route along which the material receiving machine is to conduct the material transfer operation; identify a material transfer machine slope value; identify a material receiving machine slope value; generate an adjustment based on the identified material transfer machine slope value and the material receiving machine slope value; and control one or more of the material transfer machine and the material receiving machine based on the adjustment.

19 Claims, 18 Drawing Sheets

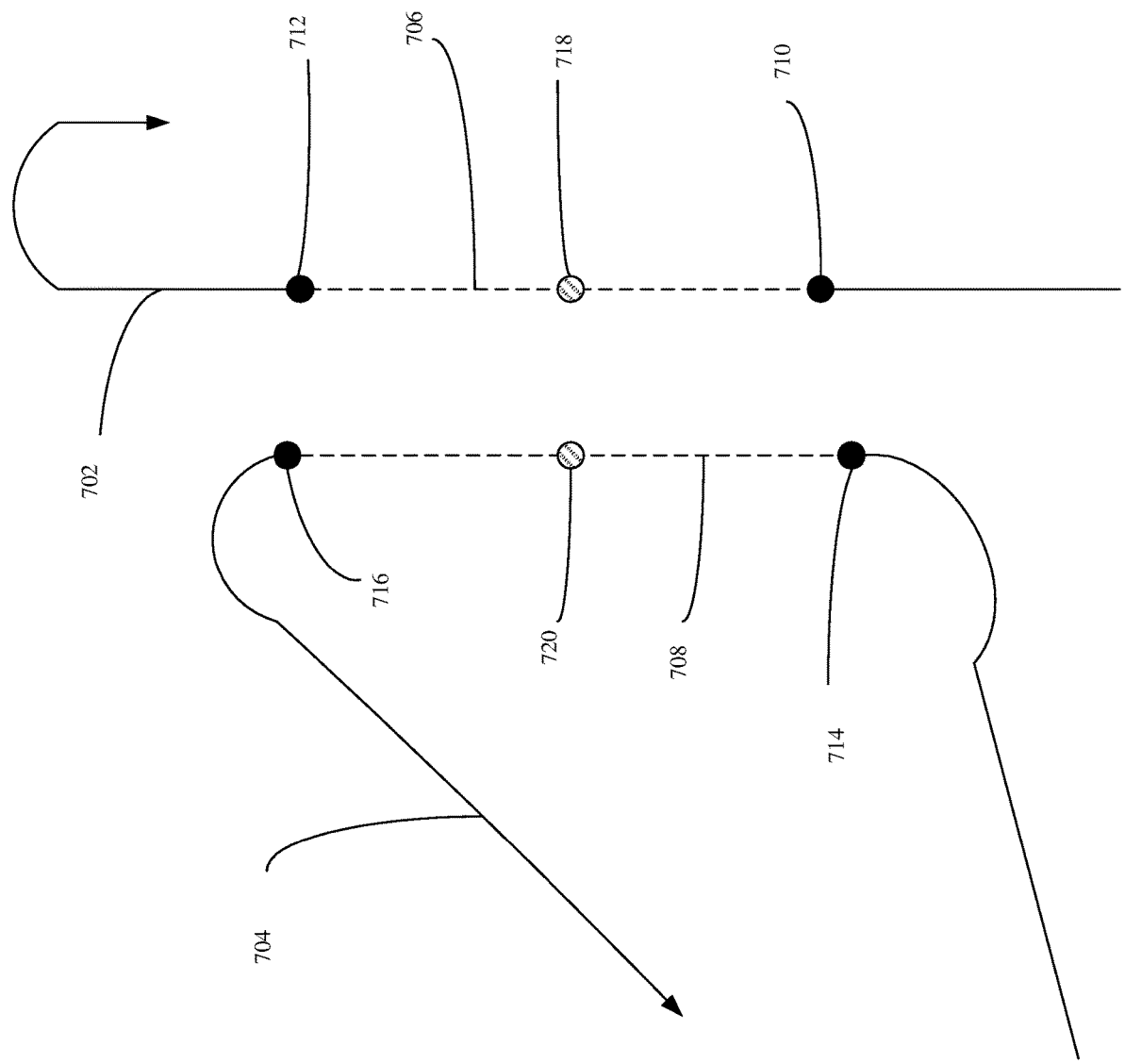

METHODS AND SYSTEMS TO DETERMINE MATERIAL TRANSFER LOCATIONS

FIELD OF THE DESCRIPTION

The present description relates to agricultural operations. More specifically, the present description relates to material transfer operations between work machines.

BACKGROUND

There are a wide variety of different types of work machines, such as agricultural work machines. Some work machines may carry material and transfer the material to another machine. The machines that transfer material to another machine can be referred to as material transfer machines. Some work machines may receive material from another machine and carry the material. The machines that receive the material can be referred to as material receiving machines. In some examples, a machine may both receive material from another machine and transfer material to another machine. Thus, such machines can be both a material transfer machine and a material receiving machine. As an example, an agricultural harvester can be a material transfer machine. The agricultural harvester can harvest and store crop material (e.g., grain) on-board and can also include a material transfer subsystem that functions to transfer the on-board crop material to another agricultural work machine, such as a grain cart. The grain cart may be towed by another vehicle, such as a tractor. The grain cart or the combination of the grain cart and the tractor form a receiving machine. The grain may also be transferred to another receiving vehicle, such a grain truck (e.g., semi-truck and trailer). The grain may be transferred to the grain truck from the grain cart or agricultural harvester. In some examples, a receiving machine, such as a towed grain cart, can also include a material transfer subsystem that can be used to transfer the crop carried by the grain cart (e.g., received from an agricultural harvester) to another agricultural work machine in the form of a receiving machine, such as a grain truck. Thus, some receiving machines, such as towed grain carts, can also be material transfer machines.

The discussion above is merely provided for general background information and is not intended to be used as an aid in determining the scope of the claimed subject matter.

SUMMARY

A material transfer operation system includes one or more processors and memory storing instructions that, when executed by the one or more processors, configure the one or more processors to identify a material transfer machine material transfer route indicative of a route along which a material transfer machine is to conduct a material transfer operation; identify a material receiving machine material transfer route indicative of a route along which the material receiving machine is to conduct the material transfer operation; identify a material transfer machine slope value; identify a material receiving machine slope value; generate an adjustment based on the identified material transfer machine slope value and the material receiving machine slope value; and control one or more of the material transfer machine and the material receiving machine based on the adjustment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 6 is a diagrammatic view showing one example operation of material transfer control system.

DETAILED DESCRIPTION

Figure 1:
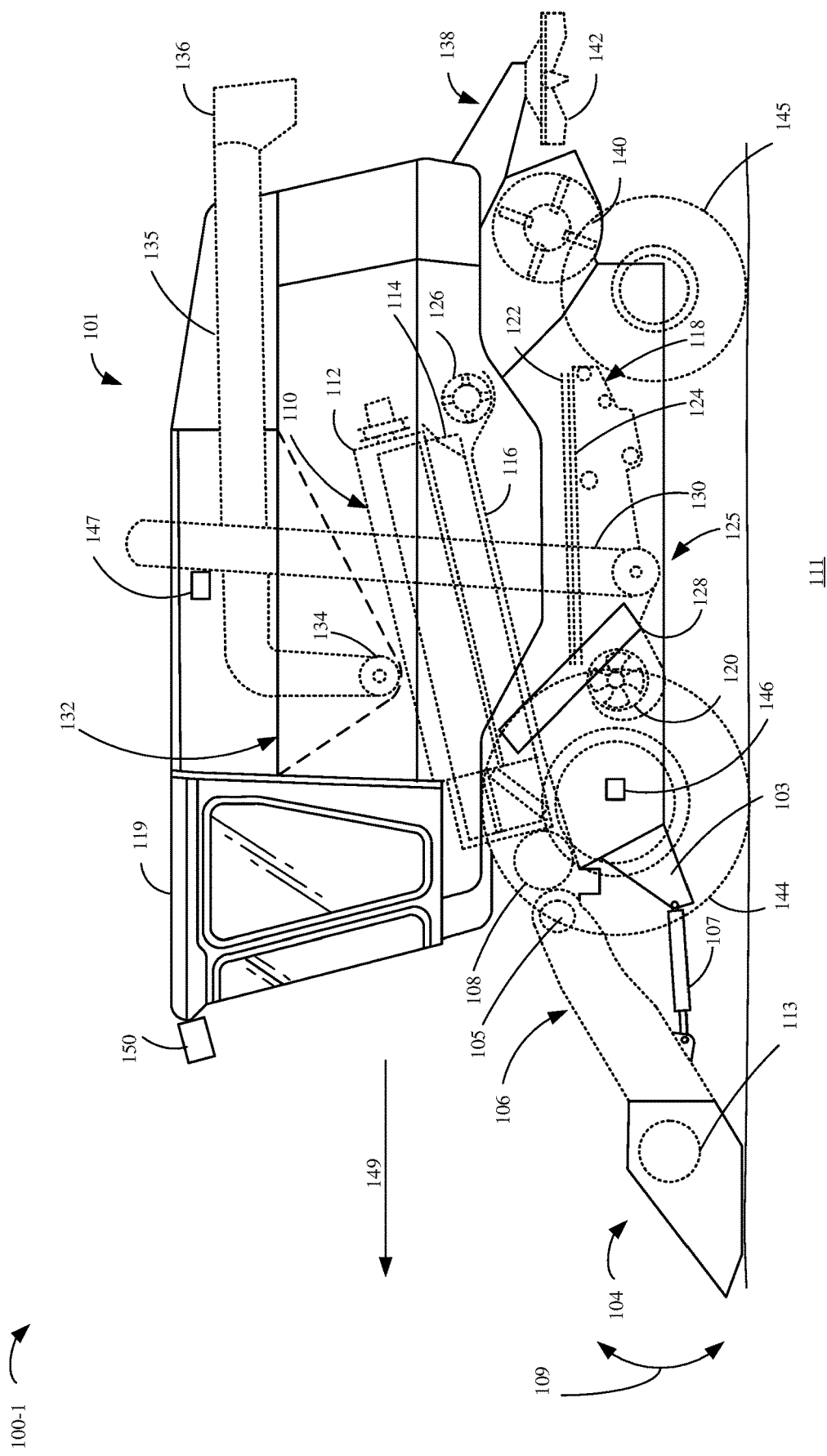
FIG. 1 is a partial pictorial, partial schematic illustration of one example material transfer machine.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

During some work operations, such as harvesting, material is transferred from one work machine to another (e.g., from an agricultural harvester to a towed grain cart or a grain truck or from a towed grain cart to a grain truck). In some examples, the material transfer may take place while both the material transfer machine and the material receiving machine continue moving. This is sometimes referred to as in-tandem material transfer (or in-tandem material unloading). In some examples, the terrain conditions (or topographic characteristics) (e.g., elevation, slope, aspect, etc.) may change along the path of the material transfer machine or the material receiving machine, or both. The change in terrain may cause contact between the material transfer machine and the material receiving machine or may cause material spill, or both. For example, a material transfer machine may include a material transfer subsystem that includes components (e.g., chute, etc.) which extend out and away from the material transfer machine and are aligned relative to a material receptacle of the material receiving machine (e.g., are aligned over the material receptacle such that material is deposited into the material receptacle). As terrain conditions change, orientation of the machine(s) may also change which in turn will alter the alignment of the components of the material transfer subsystem of the material transfer machine relative to the material receptacle of the material receiving machine. This change in alignment may lead to material spill (e.g., given the adjusted alignment, the material is no longer deposited in the material receptacle but instead, on the ground or another location) or may lead to contact between the material transfer machine and the material receiving machine (e.g., contact between the components of the material transfer subsystem of the material transfer machine and the material receiving machine), or both. Material spill and contact between machines can reduce profitability of the work operation.

It can be difficult for operators of the work machines to determine when and if terrain changes will lead to material spill or contact between the machines and to make adjustments in operation to compensate for the terrain changes. Similarly, it can be difficult for operators to determine whether a material transfer operation should be initiated or continued based on terrain.

The present discussion proceeds, in some examples, with respect to systems and methods that determine slope differential between a material transfer machine and a material receiving machine, and in some examples, compare the slope differential to a reference (e.g., threshold) value. The slope differential can be used to control a material transfer machine or a material receiving machine, or both, to control aspects of a material transfer operation, or to control interface mechanisms to present information to an operator (or other user).

It will be noted that while the various examples discussed herein proceed in the context of agricultural work machines, the systems and methods described herein are applicable to and can be used in various other work machines.

FIG. 1 is a partial pictorial, partial schematic illustration of a material transfer machine 100 (illustratively shown as 100-1). In the example shown in FIG. 1, material transfer machine 100-1 is in the form of an agricultural harvester 101 (illustratively a combine harvester). As illustrated in FIG. 1, harvester 101 includes ground engaging traction elements (wheels or tracks) 144 and 145 which can be driven by a propulsion subsystem (e.g., motor or engine and other drivetrain elements) to propel harvester 101 across a worksite 111 (e.g., a field). Harvester includes an operator compartment or cab 119, which can include a variety of different operator interface mechanisms (e.g., 318 shown in FIG. 4) for controlling harvester 101 as well as for displaying various information. Harvester 101 includes a feeder house 106, a feed accelerator 108, and a thresher generally indicated at 110. The feeder house 106 and the feed accelerator 108 form part of a material handling subsystem 125. Header 104 is pivotally coupled to a frame 103 of harvester 101 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 1, agricultural harvester 101 may also include one or more actuators that operate to apply a tilt angle, a roll angle, or both to the header 104 or portions of header 104.

Agricultural harvester 101 includes a material handling subsystem 125 that includes a thresher 110 which illustratively includes a threshing element 112 (illustratively a threshing rotor) and a set of concaves 114. Further, material handling subsystem 125 also includes a separator 116. Agricultural harvester 101 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, and clean grain elevator 130. The clean grain elevator moves clean grain into a material receptacle (or clean grain tank) 132.

Harvester 101 also includes a material transfer subsystem that includes a conveying mechanism 134 and a chute 135. Chute 135 includes a spout 136. In some examples, spout 136 can be movably coupled to chute 135 such that spout 136 can be controllably rotated to change the orientation of spout 136. Conveying mechanism 134 can be a variety of different types of conveying mechanisms, such as an auger or blower. Conveying mechanism 134 is in communication with clean grain tank 132 and is driven (e.g., by an actuator, such as motor or engine) to convey material from grain tank 132 through chute 135 and spout 136. Chute 135 is rotatable through a range of positions from a storage position (shown in FIG. 1) to a variety of positions away from agricultural harvester 101 to align spout 136 relative to a material receptacle (e.g., grain cart, towed trailer, etc.) that is configured to receive the material within grain tank 132. Spout 136, in some examples, is also rotatable to adjust the direction of the material stream exiting spout 136.

Harvester 101 also includes a residue subsystem 138 that can include chopper 140 and spreader 142. Harvester 101 also includes a propulsion subsystem that includes an engine (or other form of power plant) that drives ground engaging traction components, such as 144 or 144 and 145 to propel the harvester 101 across a worksite such as a field (e.g., ground 111). In some examples, a harvester within the scope of the present disclosure may have more than one of any of the subsystems mentioned above. In some examples, harvester 101 may have left and right cleaning subsystems, separators, etc., which are not shown in FIG. 1.

In operation, and by way of overview, harvester 101 illustratively moves through a worksite (e.g., field) 111 in the direction indicated by arrow 149. As harvester 101 moves, header 104 engages the crop plants to be harvested and cuts (with a cutter bar on the header 104, not shown in FIG. 1) the crop plants to generate cup crop material.

The cut crop material is engaged by a cross auger 113 which conveys the separated crop material to a center of the header 104 where the severed crop material is then moved through a conveyor in feeder house 106 toward feed accelerator 108, which accelerates the separated crop material into thresher 110. The separated crop material is threshed by threshing element 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 101 in a windrow.

Grain falls to cleaning subsystem 118. Chaffer 122 separates some larger pieces of MOG from the grain, and sieve 124 separates some of finer pieces of MOG from the grain. The grain then falls to an auger that moves the grain to an inlet end of grain elevator 130, and the grain elevator 130 moves the grain upwards, depositing the grain in grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in harvester 101 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

Harvester 101 can include a variety of sensors, some of which are illustrated in FIG. 1, such as ground speed sensor 146, one or more mass flow sensors 147, and one or more observation sensors 150.

Ground speed sensor 146 senses the travel speed of a work machine over the ground. Ground speed sensor 146 may sense the travel speed of the work machine by sensing the speed of rotation of the ground engaging traction elements (e.g., 144 or 145, etc.), or both, a drive shaft, an axle, or other components. In some instances, the travel speed may be sensed using a positioning system, such as a global positioning system (GPS), a dead reckoning system, a long range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when a work machine is on a slope, the orientation of the work machine relative to the slope is known. For example, an orientation of the work machine could include ascending, descending or transversely travelling the slope.

Mass flow sensors 147 sense the mass flow of material (e.g., grain) through clean grain elevator 130. Mass flow sensors 147 may be disposed at various locations, such as within or at the outlet of clean grain elevator 130. In some examples, the mass flow rate of material sensed by mass flow sensors 147 is used in the calculation of yield as well as in the calculation of the fill level of the on-board material tank 132. In some examples, mass flow sensors 147 include an impact (or strike) plate that is impacted by material (e.g., grain) conveyed by clean grain elevator 130 and a force or load sensor that detects the force or load of impact of the material on the impact (or strike) plate. This is merely one example of a mass flow sensor.

Observation sensors 150 can include one or more of a variety of sensors, such as cameras (e.g., mono or stereo cameras), lidar sensors, radar sensors, ultrasonic sensors, as well as a variety of other sensors. Observation sensors 150 can detect characteristics at the worksite, such as characteristics at the worksite around (e.g., ahead of, etc.) a work machine. While FIG. 1 shows some example positions of observation sensors 150, it will be understood that observation sensors 150 can be positioned (or otherwise disposed) at a variety of other locations on harvester 101.

Harvester 101 can include various other sensors, some of which will be discussed below.

Figure 2:
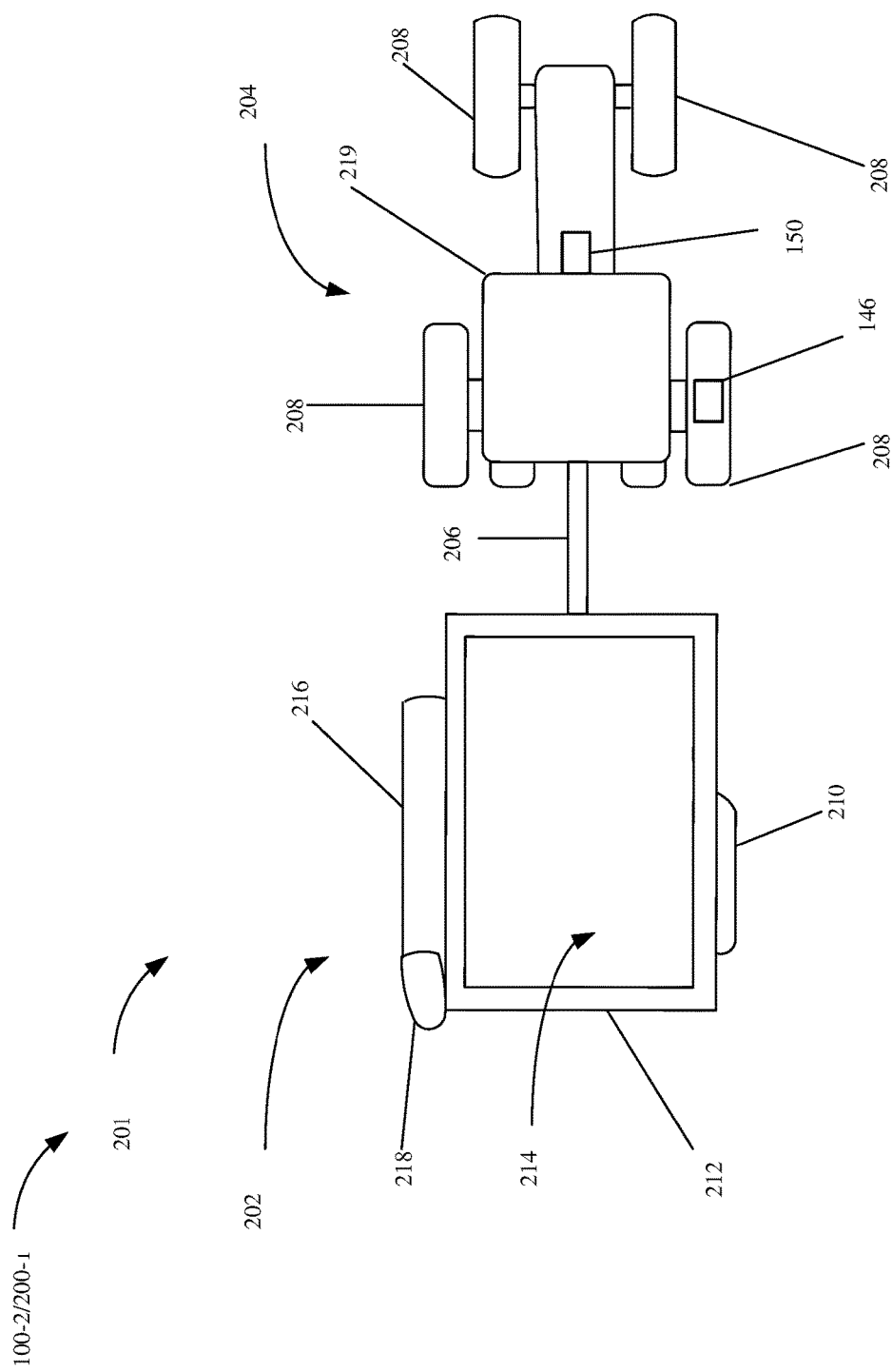
FIG. 2 is a top view of one example material transfer and material receiving machine.

FIG. 2 is a top view of one example of a material transfer machine 100 (illustratively shown as 100-2) and one example of a material receiving machine 200 (illustratively shown as 200-1). In the example of FIG. 2, material transfer machine 100-1 and material receiving machine 200-1 is in the form a towed grain cart 201. As previously discussed, some machines can be both a material transfer machine and a material receiving machine. Towed grain cart 201 includes grain cart 202 and towing machine 204. Grain cart 202 and towing machine 204 (illustratively a tractor) are coupled by way of a linkage 206. Linkage 206 can include mechanical, electrical, hydraulic, and pneumatic connections. Towing machine 204, itself, includes an operator compartment or cab 219, which can include a variety of different operator interface mechanisms (e.g., 318/418 shown in FIG. 4) for controlling towed grain cart 201 as well as for displaying various information. Towing machine 204 also includes ground engaging traction elements (e.g., wheels or tracks) 208 which can be driven by a propulsion subsystem (e.g., motor or engine and other drivetrain elements) to propel towed grain cart 201 across a worksite (e.g., field).

Grain cart 202, itself, includes ground engaging traction elements (e.g., wheels or tracks) 210 (only one shown in FIG. 2, though grain cart 202 includes two), which are driven by virtue of the linkage to towing machine 204. Grain cart 202 also includes a material receptacle (or material tank) 212 that defines a volume 214 for receiving material. Grain cart 202 also includes a material transfer subsystem that includes a conveying mechanism (not shown), a chute 216, and a spout 218. Conveying mechanism can be a variety of different types of conveying mechanism, such as an auger or blower. Additionally, while the material transfer subsystem is shown as being disposed at a given location in the example shown in FIG. 2, it will be understood that in other examples, the material transfer subsystem can be disposed elsewhere on grain cart 202, such as on the front of grain cart 202. The conveying mechanism is in communication with material receptacle 212 (or the volume 214 of material receptacle 212) and is driven (e.g., by an actuator, such as motor or engine) to convey material from material receptacle 212 through chute 216 and spout 218. Chute 216 is rotatable through a range of positions from a storage position (shown in FIG. 2) to a variety of positions away from grain cart 202 to align spout 218 relative to a material receptacle (e.g., towed trailer, etc.) that is configured to receive the material within material receptacle 212. Spout 218, in some examples, is also rotatable to adjust the direction of the material stream exiting spout 218.

Towed grain cart 201 can include a variety of sensors, some of which are illustrated in FIG. 2, such as ground speed sensor 146 and one or more observation sensors 150. These sensors were previously discussed and will also be discussed in more detail in FIG. 4. Additionally, while FIG. 2 shows some example positions of observation sensors 150, it will be understood that observation sensors 150 can be positioned (or otherwise disposed) at a variety of other locations on towed grain cart 201. Further, towed grain cart 201 can include various other sensors, some of which will be discussed below.

While FIG. 2 shows a towing machine 204 in the form of a tractor, it will be understood that in other examples, towing machine can be one of a variety of other types of towing machines (e.g., trucks, etc.). Further, it will be understood that while the example receiving machine shown in FIG. 2 includes a towing vehicle, it will be understood that in other examples, the machine that includes the material receptacle can also include the propulsion means, for instance, a self-propelled grain cart. Additionally, while the example in FIG. 2 shows grain cart as including a material transfer subsystem, in some examples, may not include a material transfer subsystem or may include a different type of material transfer subsystem.

Figure 3:
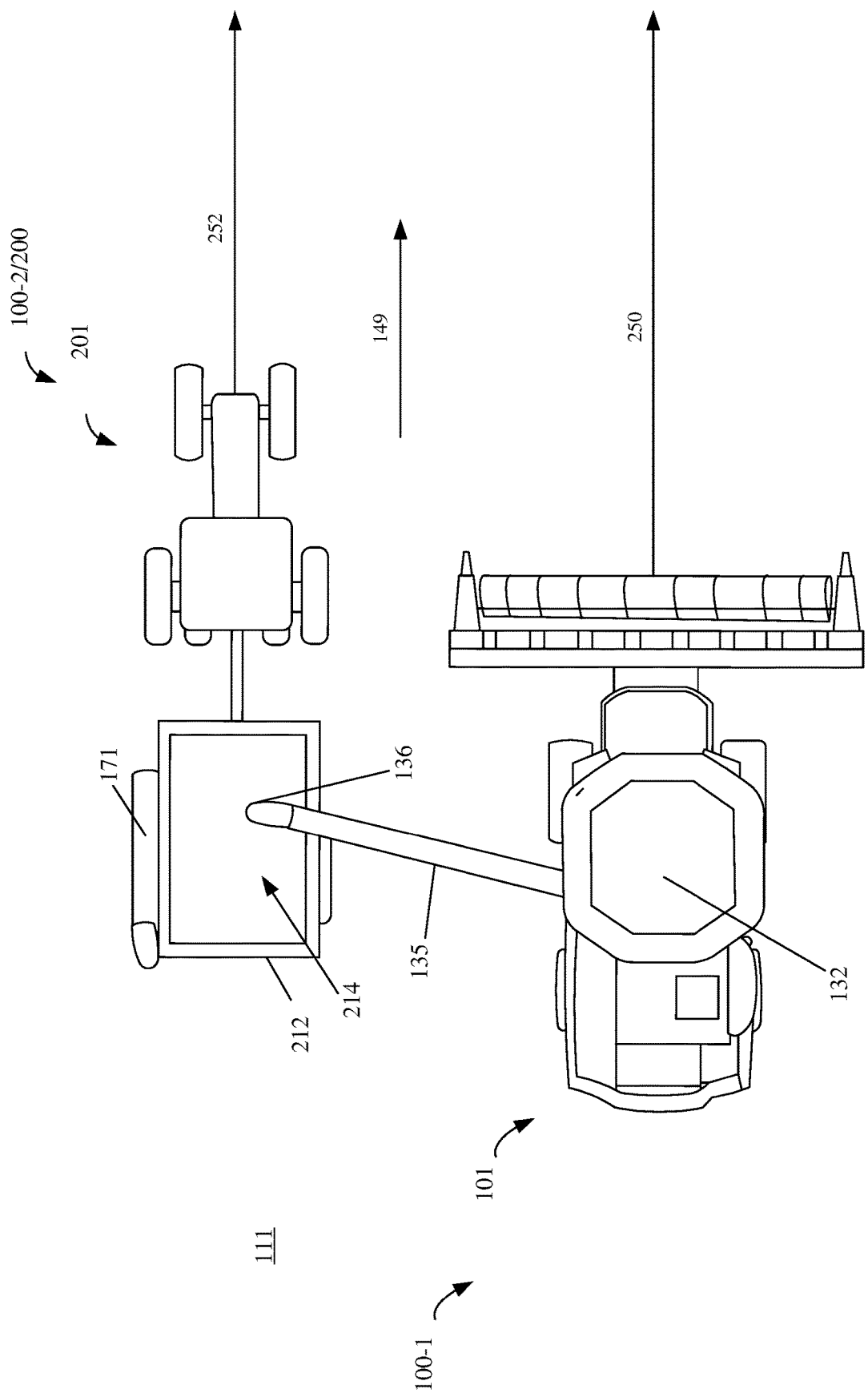
FIG. 3 is a top view of one example material transfer operation.

FIG. 3 is a top view of one example of a worksite 111 at which a material transfer operation is being conducted. As illustrated in FIG. 3, harvester 101 and towed grain cart 201 are traveling alongside one another (i.e., in tandem) in a travel direction 149 along a respective route 250 and 252 across worksite 111. The material transfer subsystem of harvester 101 has been controlled to extend chute 135 to a deployed position in which spout 136 is aligned over material receptacle 212 such that material from grain tank 132, conveyed through chute 135 and spout 136, will land in volume 214 of material receptacle 212. During the course of a material transfer operation, the relative alignment of the receiving machine 200 and the material transfer machine can be changed to change the landing spot of material in the material receptacle, in some examples according to a fill strategy (e.g., filling the machine from the front of the material receptacle to the back of the material receptacle filling the machine from the back of the material receptacle to the front of the material receptacle, etc.). For example, the receiving machine 200 may be temporarily sped up or slowed down (relative to the speed of the material transfer machine 100) to change a relative longitudinal positioning between the machines (e.g., change how far forward or how far backward one machine is compared to the other machine) and thus, change the landing spot of material. In other examples, the chute 135 and/or spout 136 can be controllably moved to change the landing spot of material. Once the material receptacle of the receiving machine 200 is filled to a desired level (e.g., full or threshold fill level) or once the material receptacle of the material transfer machine 100 is emptied, the material transfer operation May end. In which case, chute 135 may be retracted back to a storage position and the receiving machine 200 may travel to another location to unload the received material. In some examples, a material transfer operation may end based on other criteria (e.g., coming to an end of a pass, etc.).

The slope (e.g., front-to-back slope, side-to-side slope, or both) of worksite 111 may change along route 250 or route 252, or both, and thus, the orientation of the machines May change. The change in orientation of one or both of the machines may affect the alignment between the machines such that material may spill (e.g., not land in a material receptacle) or may land in an undesirable location in material receptacle (e.g., contrary to the desired fill strategy). Additionally, the alignment may be affected such that contact between the machines occurs, for instance, the spout 136 or chute 135 may come into contact with the material receiving machine 200.

Figure 4:
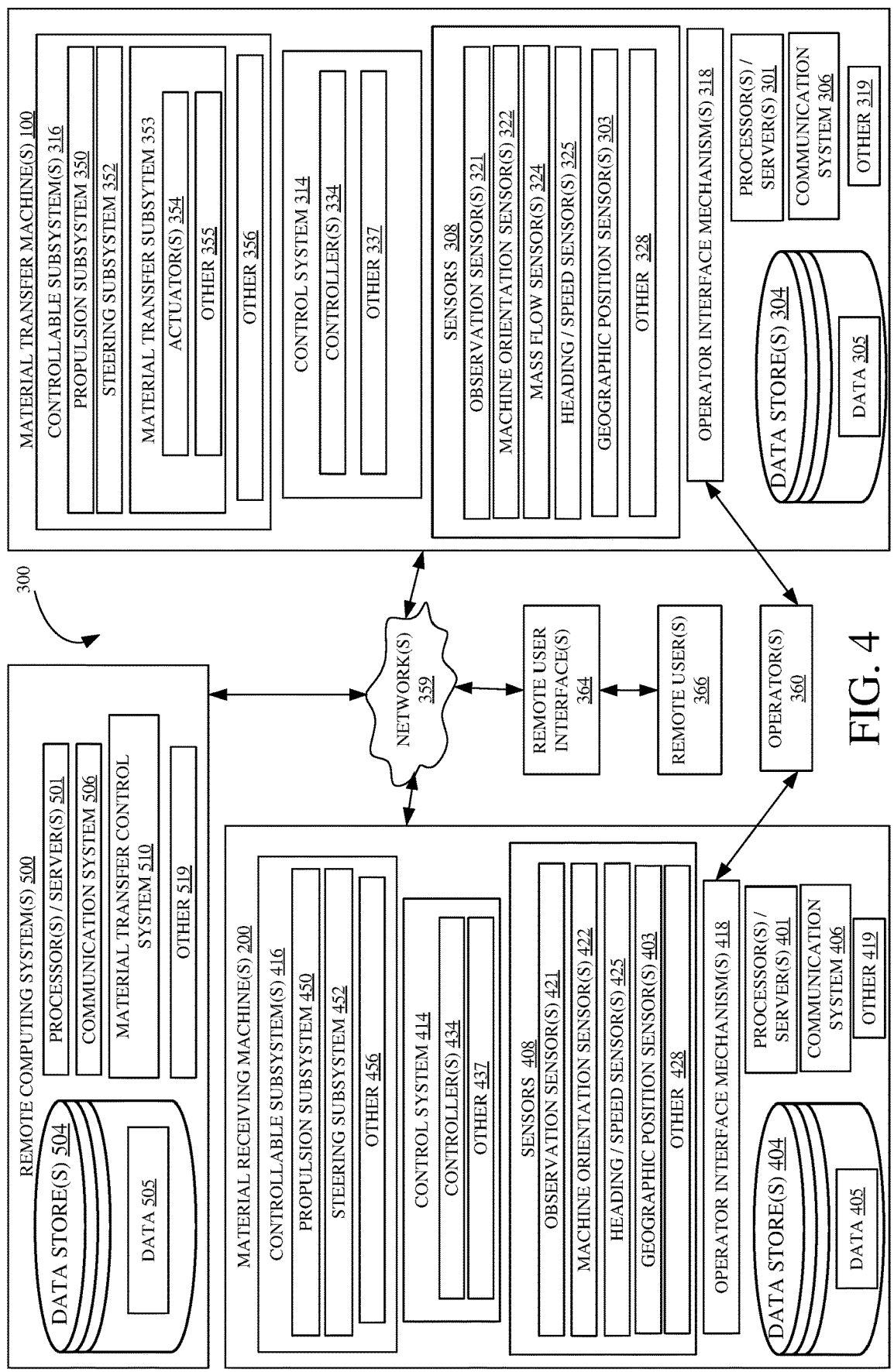
FIG. 4 is a block diagram of one example material transfer operation system architecture.

FIG. 4 is a block diagram of a material transfer operation system architecture 300 (also referred to herein as material transfer operation system 300 or system 300) in more detail. FIG. 4 shows that material transfer operation system 300 includes one or more material transfer machines 100, one or more material receiving machines 200, one or more remote computing systems 500, and one or more remote user interfaces 364. Material transfer machines 100, themselves, illustratively include one or more processors or servers 301, one or more data stores 304, a communication system 306, one or more sensors 308, a control system 314, one or more controllable subsystems 316, and can include various other items and functionality 319. Material receiving machines 200, themselves, illustratively include one or more processors or servers 401, one or more data stores 404, a communication system 406, one or more sensors 408, a control system 414, one or more controllable subsystems 416, and can include various other items and functionality 419. Remote computing systems 500, themselves, illustratively include one or more processors or servers 501, one or more data stores 504, a communication system 506, a material transfer control system 510, and can include various other items and functionality 519.

Data stores 304, 404, and 504 store a variety of data (generally indicated as data 305, data 405, and data 505 respectively), some of which will be described in more detail herein. For example, one or more of data 305, data 405, and data 505, can include, among other things, georeferenced worksite data, such as worksite maps, thresholds, machine data, route data, sensor data generated by sensors (e.g., 308 or 408, or both), as well as a variety of other data. Additionally, data 305 can include computer executable instructions that are executable by one or more processors or servers 301 to implement other items or functionalities of material transfer operation system 300. Additionally, data 405 can include computer executable instructions that are executable by one or more processors or servers 401 to implement other items or functionalities of material transfer operation system 300. Additionally, data 505 can include computer executable instructions that are executable by one or more processors or servers 501 to implement other items or functionalities of material transfer operation system 300. It will be understood that data stores 304, data stores 404, and data stores 505 can include different forms of data stores, for instance one or more of volatile data stores (e.g., Random Access Memory (RAM)) and non-volatile data stores (e.g., Read Only Memory (ROM), hard drives, solid state drives, etc.).

Sensors 308 can include one or more observation sensors 321, one or more machine orientation sensors 322, one or more mass flow sensors 324, one or more heading/speed sensors 325, one or more geographic position sensors 303, and can include various other sensors 328 as well. Sensors 408 can include one or more observation sensors 421, one or more machine orientation sensors 422 one or more heading/speed sensors 425, one or more geographic position sensors 403, and can include various other sensors 428 as well.

Observation sensors 321 can include one or more of a variety of sensors, such as cameras (e.g., mono or stereo cameras), lidar sensors, radar sensors, ultrasonic sensors, as well as a variety of other sensors. Observation sensors 321 can detect characteristics at the worksite, such as characteristics at the worksite around (e.g., ahead of, etc.) a material transfer machine 100. In one example, observation sensors 321 can be similar to observation sensors 150. Observation sensors 421 can include one or more of a variety of sensors, such as cameras (e.g., mono or stereo cameras), lidar sensors, radar sensors, ultrasonic sensors, as well as a variety of other sensors. Observation sensors 421 can detect characteristics at the worksite, such as characteristics at the worksite around (e.g., ahead of, etc.) a material receiving machine 200. In one example, observation sensors 421 can be similar to observation sensors 150.

Machine orientation sensors 322 detect orientation (e.g., pitch, roll, and yaw) of a material transfer machine 100. Machine orientation sensors 322 can include one or more of a variety of sensors including inertial measurement units (IMUs), accelerometers, gyroscopes, magnetometer, as well as a variety of other sensors. Machine orientation sensors 422 detect orientation (e.g., pitch, roll, and yaw) of a material receiving machine 200. Machine orientation sensors 422 can include one or more of a variety of sensors including inertial measurement units (IMUs), accelerometers, gyroscopes, magnetometer, as well as a variety of other sensors.

Mass flow sensors 324 detect material flow into a material receptacle of the corresponding material transfer machine

100. For instance, where the material transfer machine 100 is a harvester 101, the mass flow sensors 324 detect a mass flow of harvested crop material into the material receptacle (grain tank) 132. The mass flow of material detected by mass flow sensors 324 can be used to calculate yield (e.g., instantaneous yield). The mass flow of material detected by mass flow sensors 324 can also be aggregated to calculate an average yield or to calculate a fill level of the material transfer machine 100. The mass flow sensors 324 can comprise one or more impact sensors, positioned in the clean grain elevator 130, that are impacted by crop material (grain) as the crop material is flowing into the grain tank 132. In other examples, the mass flow sensors 324 can be other types of flow sensing devices such as non-contact sensors, for instance, electromagnetic (EM) radiation sensing devices that generate EM radiation that is directed through the crop material flow and receive the EM radiation that flows through or is reflected from the crop material flow. In one example, mass flow sensors 324 are similar to mass flow sensors 147. These are merely some examples.

Heading/speed sensors 325 detect a heading characteristic (e.g., travel direction) or speed characteristics (e.g., travel speed, acceleration, deceleration, etc.), or both, of a corresponding material transfer machine 100. This can include sensors that sense the movement (e.g., rotation) of ground- or movement of components coupled to the ground engaging elements or other elements, or can utilize signals received from other sources, such as geographic position sensors 303. Thus, while heading/speed sensors 325 as described herein are shown as separate from geographic position sensors 303, in some examples, machine heading/speed is derived from signals received from geographic position sensors 303 and subsequent processing. In other examples, heading/speed sensors 325 are separate sensors and do not utilize signals received from other sources. Heading/speed sensors 425 detect a heading characteristic (e.g., travel direction) or speed characteristics (e.g., travel speed, acceleration, deceleration, etc.), or both, of a corresponding material receiving machine 200. This can include sensors that sense the movement (e.g., rotation) of ground-engaging traction elements (e.g., wheels or tracks) or movement of components coupled to the ground engaging elements or other elements, or can utilize signals received from other sources, such as geographic position sensors 403. Thus, while heading/speed sensors 425 as described herein are shown as separate from geographic position sensors 403, in some examples, machine heading/speed is derived from signals received from geographic position sensors 403 and subsequent processing. In other examples, heading/speed sensors 425 are separate sensors and do not utilize signals received from other sources.

Geographic position sensors 303 illustratively sense or detect the geographic position or location of a corresponding material transfer machine 100. Geographic position sensors 303 can include, but are not limited to, a global navigation satellite system (GNSS) receiver that receives signals from a GNSS satellite transmitter. Geographic position sensors 403 can also include a real-time kinematic (RTK) component that is configured to enhance the precision of position data derived from the GNSS signal. Geographic position sensors 303 can include a dead reckoning system, a cellular triangulation system, or any of a variety of other geographic position sensors. Geographic position sensors 403 illustratively sense or detect the geographic position or location of a corresponding material receiving machine 400. Geographic position sensors 403 can include, but are not limited to, a global navigation satellite system (GNSS) receiver that receives signals from a GNSS satellite transmitter. Geographic position sensors 403 can also include a real-time kinematic (RTK) component that is configured to enhance the precision of position data derived from the GNSS signal. Geographic position sensors 403 can include a dead reckoning system, a cellular triangulation system, or any of a variety of other geographic position sensors.

A material transfer machine 100 can include one or more of a variety of other sensors 328 that detect a variety of other characteristics. A material receiving machine 200 can include one or more of a variety of other sensors 428 that detect a variety of other characteristics.

Controllable subsystems 316 can include a propulsion subsystem 350, a steering subsystem 352, a material transfer subsystem 353, as well as various other controllable subsystems 356. Material transfer subsystem 353, itself, includes one or more material transfer subsystem actuators 354, and can include various other items 355. Controllable subsystems 416 include propulsion subsystem 450, steering subsystem 452, and can include various other controllable subsystems 456.

Propulsion subsystem 350 illustratively propels material transfer machine 100 across a worksite by driving ground engaging traction elements (e.g., wheels or tracks). Propulsion subsystem 350 can include one or more actuators (e.g., engine, motors, fluid pumps, etc.) to actuate various drive train elements (e.g., transmission, rotatable shafts, axles, etc.) to drive the ground engaging traction elements. Propulsion subsystem 350 is controllable to vary the speed of material transfer machine 100 and the direction in which the material transfer machine 100 is being driven (e.g., forward or reverse). Propulsion subsystem 450 illustratively propels material receiving machine 200 across a worksite by driving ground engaging traction elements. Propulsion subsystem 450 can include one or more actuators (e.g., engine, motors, fluid pumps, etc.) to actuate various drive train elements (e.g., transmission, rotatable shafts, axles, etc.) to drive the ground engaging traction elements. Propulsion subsystem 450 is controllable to vary the speed of material receiving machine 200 and the direction in which the material receiving machine 200 is being driven (e.g., forward or reverse).

Steering subsystem 350 illustratively controls the direction of travel (steering or heading) of material transfer machine 100. Steering subsystem 350 can include one or more actuators (e.g., electric or hydraulic actuators) that actuate to change a steering angle of one or more ground engaging traction elements. Thus, steering subsystem is controllable to vary the direction of travel (heading or steering) of material transfer machine 100. Steering subsystem 450 illustratively controls the direction of travel (steering or heading) of material receiving machine 200. Steering subsystem 450 can include one or more actuators (e.g., electric or hydraulic 9 actuators) that actuate to change a steering angle of one or more ground engaging traction elements. Thus, steering subsystem is controllable to vary the direction of travel (heading or steering) of material receiving machine 200.

Material transfer subsystem actuators 354 include actuators (e.g., hydraulic, electric, pneumatic, etc.) to actuate a material transfer subsystem between a stored position and a variety of deployed positions (e.g., to cause extension and retraction of the material transfer subsystem) as well as actuators (e.g., motor, engine, pump, etc.) used to drive the conveying mechanism (e.g., auger, blower, etc.) of material transfer subsystem. Thus, material transfer subsystem actuators 354 include actuators that are controllable to actuate (extend and retract) material transfer subsystem and actuators that are controllable to actuate (drive) the conveying mechanism of the material transfer subsystem. Other items 355 include conveying mechanisms (e.g., auger, blower, etc.), chutes (e.g., 135, 216, etc.), spouts (e.g., 136, 218, etc.), as well as various other items.

Control system 314 can include one or more controllers 334, and can include various other items 337. Controllers 334 illustratively generate control signals to control controllable subsystems 316 as well as other items of agricultural system 300 (e.g., operator interface mechanisms 318 or user interface mechanisms 364). In one example, each subsystem 316 can have a dedicated controller 334 (e.g., a propulsion subsystem controller, a steering subsystem controller, a material transfer subsystem actuator controller, other subsystem controllers). In another example, a central controller 334 can control a plurality of the controllable subsystems 316. Controllers 334 can generate control signals based on various data, including sensor data generated by sensors 308 or sensors 408 or based on outputs from material transfer control system 510.

Control system 414 can include one or more controllers 434 and can include various other items 437. Controllers 434 illustratively generate control signals to control controllable subsystems 416 as well as other items of agricultural system 300 (e.g., operator interface mechanisms 418 or user interface mechanisms 364). In one example, each subsystem 416 can have a dedicated controller 434 (e.g., a propulsion subsystem controller, a steering subsystem controller, other subsystem controllers). In another example, a central controller 434 can control a plurality of the controllable subsystems 416. Controllers 434 can generate control signals based on various data, including sensor data generated by sensors 308 or sensors 408 or based on outputs from material transfer control system 510.

Material transfer control system 510 generally predicts, determines, and plans the parameters of a material transfer operation including, but not limited, material transfer routes, start and stop locations, pause and resume locations, machine settings, as well as various other 14 parameters of a material transfer operation. Material transfer control system 510 will be discussed in more detail in FIG. 5.

Communication system 306 is used to communicate between components of a material transfer machine 100 or with other items of agricultural system 300, such as other material transfer machines 100, remote computing systems 500, and material receiving machines 200. Communication system 406 is used to communicate between components of a material receiving machine 200 or with other items of material transfer operation system 300, such as other material receiving machines 200, remote computing systems 500, and material transfer machines 100. Communication system 506 is used to communicate between components of a remote computing system 500 or with other items of agricultural system 300, such as other remote computing systems 500, material transfer machines 100, and material receiving machines 200.

Communication systems 306, 406, 506 can each include one or more of wired communication circuitry and wireless communication circuitry, as well as wired and wireless communication components. In some examples, communication systems 306, 406, and 506 can each be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication systems 306, 406, and 506 can each also include a system that facilitates downloads or transfers of information to and from a secure digital (SD) card or a universal serial bus (USB) card, or both. Communication systems 306, 406, and 506 can each utilize network 359. Networks 359 can be any of a wide variety of different types of networks such as the Internet, a cellular network, a wide area network (WAN), a local area network (LAN), a controller area network (CAN), a near-field communication network, or any of a wide variety of other networks or communication systems.

FIG. 4 also shows remote users 366 interacting with material transfer machines 100, material receiving machines 200, and remote computing systems 500 through user interfaces mechanisms 364 over networks 359. In some examples, user interface mechanisms 364 may include joysticks, levers, a steering wheel, linkages, pedals, buttons, wireless devices (e.g., mobile computing devices, etc.), dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the users 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

FIG. 4 also shows that one or more operators 360 may operate material transfer machines 100 and material receiving machines 200. Operators 360 that operate a material transfer machine 100 interact with operator interface mechanisms 318. Operators that operate a material receiving machine 200 interact with operator interface mechanisms 418. In some examples, operator interface mechanisms 318 and 418 may include joysticks, levers, a steering wheel, linkages, pedals, buttons, wireless devices (e.g., mobile computing devices, etc.), dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the operators 360 may interact with operator interface mechanisms 318 and 418 using touch gestures. These examples described above are provided as illustrative examples and are not intended to limit the scope of the present disclosure. Consequently, other types of operator interface mechanisms 318 and 418 may be used and are within the scope of the present disclosure.

Remote computing systems 500 can be a wide variety of different types of systems, or combinations thereof. For example, remote computing systems 500 can be in a remote server environment. Further, remote computing systems 500 can be remote computing systems, such as mobile devices, a remote network, a farm manager system, a vendor system, or a wide variety of other remote systems.

While the example shown in FIG. 4 illustrates items being distributed across material transfer operation system 300 in a particular way, in other examples, one or more of the items shown in FIG. 4 can be, alternatively or additionally, located elsewhere or can be distributed across multiple locations. For example, material transfer control system 510 can, alternatively or additionally, be located on material transfer machines 100 or material receiving machines 200, or both. In another example, material transfer control system 510 can be distributed across two or more of a material transfer machine 100, a material receiving machine, and a remote computing system 500. Thus, it will be understood that the items in material transfer operation system 300 can be distributed in various ways, including ways that differ from the example shown in FIG. 4.

Figure 5:
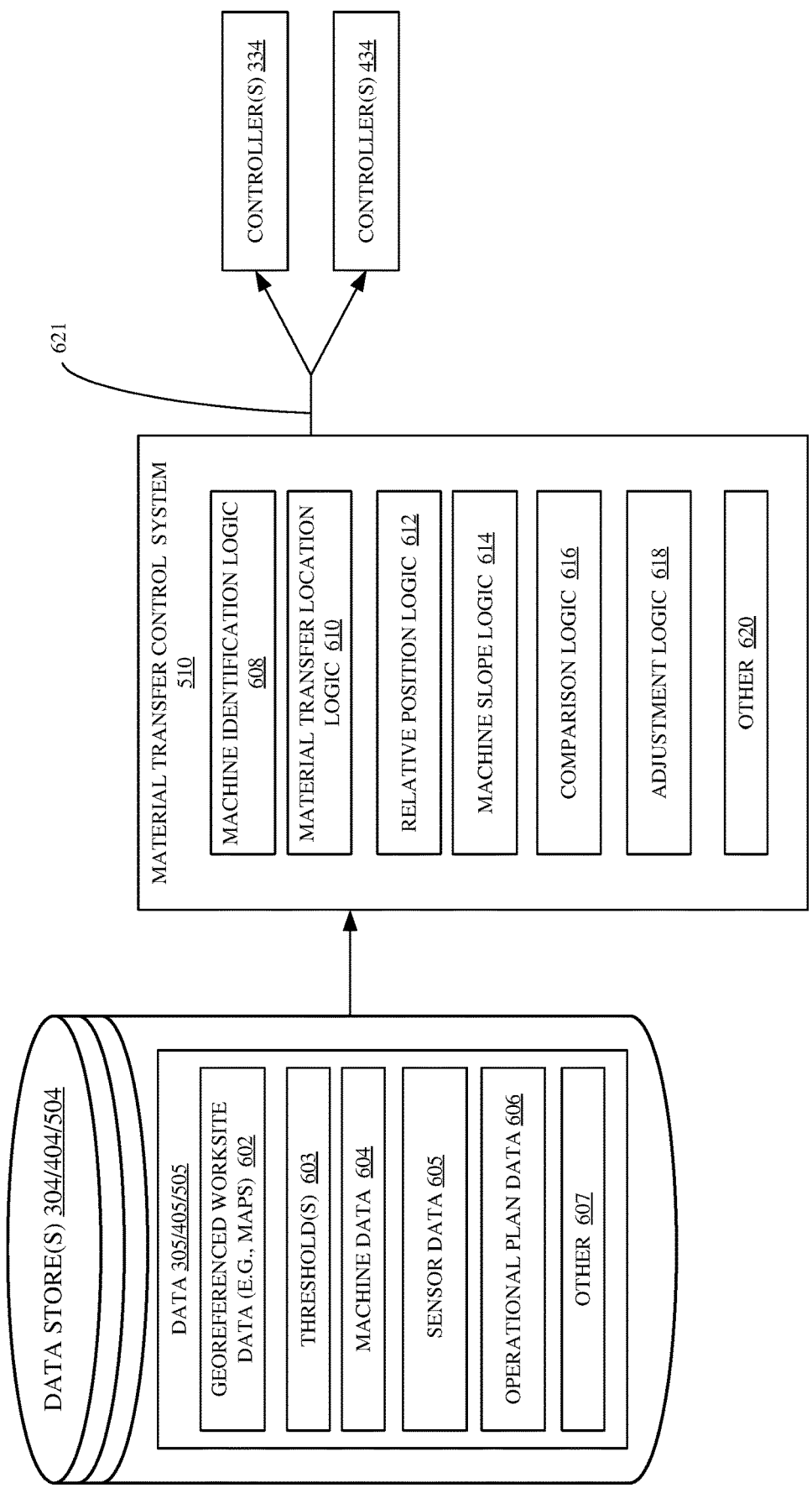
FIG. 5 is a block diagram showing one example of a material transfer control system.

FIG. 5 is a block diagram of portions of material transfer operation system 300, including material transfer control system 510, shown in FIG. 4, in more detail. FIG. 5 also shows the information flow among the various components shown. As illustrated, material transfer control system 510 obtains (e.g., retrieves or receives) one or more of data 305, 405, and 505, and generates outputs 621 based thereon. The one or more outputs 621 are obtained by controllers 334 or controllers 434, or both, and can be used to control various items of material transfer operation system 300.

Data 305, 405, and 505, can include georeferenced worksite data 602, one or more thresholds 603, machine data 604, sensor data 605, operational plan data 606, and can include various other data 607.

Georeferenced worksite data 602 can include a variety of data indicative of characteristics of a worksite or relative to a worksite. For example, georeferenced worksite data 602 can include data indicating the location of worksite boundaries, locations of crop and non-crop areas, topographic data, vegetation (e.g., crop, etc.) data, as well as various other data. Georeferenced worksite data 602 can be in the form of maps, for example, topographic maps that include values of topographic characteristics (e.g., elevation, slope, aspect, etc.) at different locations across the worksite and yield maps (e.g., predictive yield maps) that include values of yield (e.g., predictive yield values) at different locations across the worksite.

Thresholds 603 can include set or desired levels (or values) useable by material transfer control system 510. For example, thresholds 603 may be threshold slope differential levels (or values) that can be used by material transfer control system 510 to determine if adjustments should be made to a material transfer operation. Thresholds 603 may be threshold fill levels (or values) that can be used by material transfer control system 510, for example, in determining when (and where) a material transfer operation is to begin or end. In some examples, the thresholds 603 may be unique to each machine or unique to machine pairs. For example, each machine may have a unique fill level threshold. In another example, each machine pair may have a unique slope differential threshold.

Machine data 604 includes various data corresponding to the various machines (e.g., 100 and 200) of material transfer operation system 300. This includes machine dimension data (e.g., indicative of lengths, widths, and heights of the machines in various states, such as material transfer subsystem extension and retraction states), machine capacity data (e.g., capacity of material receptacles), machine rating data (e.g., unload rates of material transfer subsystems), machine identifications (e.g., unique identifications (IDs)), machine type/model, as well as various other data.

Sensor data 605 includes sensor data generated by sensors 308 which can include observation sensor data generated by observation sensors 321, machine orientation sensor data generated by machine orientation sensors 322, mass flow sensor data generated by mass flow sensors 324, heading sensor data generated by heading/speed sensors 325, speed sensor data generated by heading/speed sensors 325, geographic position sensor data generated by geographic position sensors 303, as well as various other sensor data generated by other sensors 328. Sensor data 605 includes sensor data generated by sensors 408 which can include observation sensor data generated by observation sensors 421, machine orientation sensor data generated by machine orientation sensors 422, heading sensor data generated by heading/speed sensors 425, speed sensor data generated by heading/speed sensors 425, geographic position sensor data generated by geographic position sensors 403, as well as various other sensor data generated by other sensors 428.

Operational plan data 606 can include data indicative of planned (or prescribed) operational parameters such as planned fill strategy (e.g., filling the machine from the front of the material receptacle to the back of the material receptacle, filling the machine from the back of the material receptacle to the front of the material receptacle, etc.), planned routes, planned operational speeds (e.g., planned travel speeds), planned restrictions/preferences (e.g., no material transfer while turning, no slowing the material transfer machine for material transfer, optimize time to complete, optimize efficiency, etc.).

Data stores 305, 405, and 505 can include various other data 607 some examples of which have been previously discussed.

As illustrated in FIG. 5, material transfer control system 510 includes machine identification logic 608, material transfer location logic 610, relative position logic 612, machine slope logic 614, comparison logic 616, adjustment logic 618, and can include various other items 620 as well.

Machine identification logic 608 identifies machines and machine pairs that are to conduct material transfer operations at the worksite. Machine identification logic 610 can identify the machines and machine pairs based on machine data 604. In other examples, an operator or user may provide, via input, machine identification data that can be used by machine identification logic 608. As previously discussed, each machine or machine pair, or both, may have corresponding thresholds 603 that are to be used when controlling a material transfer operation, such as a particular fill level threshold for a given machine or a particular slope differential threshold for a particular machine pair. Additionally, each machine may have particular 21 operational plans that can be obtained from operational plan data, such as particular planned routes or other particular operational parameters (e.g., planned travel speeds, etc.).

Material transfer location logic 610 identifies a location (or a route(s)) at (or along) which a material transfer operation is to take place based on various items of data 305/405/505. Material transfer location logic 610 can identify a material transfer machine material transfer route that a material transfer machine 100 is to travel during a material transfer operation. The material transfer machine material transfer route includes a start and end location.

Material transfer logic 610 can identify a start location for a material transfer machine material transfer route based on route data (e.g., planned route in operational plan data 606 or heading sensor data in sensor data 605), geographic location data (e.g., geographic position sensor data in sensor data 605), yield data (e.g., estimated or predictive yield along planned route as indicated by georeferenced worksite data 602, such as a yield map (e.g., a predictive yield map), or estimated or predictive yield model based on mass flow sensor data in sensor data 605, as well as other sources of estimated or predictive yield), current fill level data (e.g., calculated fill level of material transfer machine 100 based on aggregated yield or mass flow sensor data in sensor data 605), a material transfer machine fill capacity or fill threshold (e.g., fill capacity from machine data 604 or fill threshold from thresholds 603). Material transfer logic 610 can, knowing or predicting the current location and the route of the material transfer machine 100, knowing the current fill level of a material transfer machine 100, knowing or predicting the material accumulation (e.g., yield) ahead of the material transfer machine 100, and knowing a fill capacity (either a threshold or actual capacity) can identify a material transfer start location for a material transfer machine material transfer route. The start location can be the location at which the material transfer machine 100 will be full (at least to a threshold level) or a location a threshold distance from (e.g., a threshold distance before) the location at which the material transfer machine 100 will be full.

Material transfer logic 610 can identify an end location for a material transfer machine material transfer route in a variety of ways. For example, an end location may be at (or a threshold distance) from an end of a pass at the worksite. The end of a pass may be identified based on georeferenced worksite data 602 or route data, or both. An end location may be where a given (e.g., desired) amount of material will have been transferred. For example, there may be a threshold amount of material to be transferred per material transfer operation, and material transfer logic 610 can determine the location at which the given amount of material will have been transferred based on travel speed data, route data, and material transfer speed data (e.g., in machine data 604). An end location may be the location at which the material transfer machine 100 will be empty. Material transfer logic 610 can determine the location at which the material transfer machine 100 will be empty based on travel speed data, route data, material transfer speed data, and material accumulation data (e.g., yield data).

The route from the start location and the end location defines the material transfer machine material transfer route.

Material transfer location logic 610 can identify a material receiving machine material transfer route that a material receiving machine 200 is to travel during a material transfer operation. Material transfer location logic 610 identifies the material receiving machine material transfer route based on the determined material transfer machine material transfer route, a planned or prescribed fill strategy (e.g., in operational plan data 606), and dimensions of the machines (e.g., in machine data 604). For example, knowing the start location of the material transfer machine material transfer route, material transfer location logic 610 can identify the start location of the material receiving machine material transfer route, that is, the location at which the material receiving machine 200 is to be located in order to begin receiving material according to the fill strategy and based on the dimensions of the machines. Knowing the end location of the material transfer machine material transfer route, material transfer location logic 610 can identify the end location of the material receiving machine material transfer route, that is, the location at which the material receiving machine 200 is to be located in order to finish receiving material according to the fill strategy and based on the dimensions of the machines.

Relative position logic 612 can determine the relative position between a material transfer machine 100 and a material receiving machine 200 during a material transfer operation. That is, relative position logic 612 can determine for a given time during a material transfer operation where a material transfer machine 100 is or will be located and where a material receiving machine 200 is or will be located. Relative position logic 612 can determine the relative positioning based on sensor data 605, such as geographic location data generated by geographic positions sensors 304 and 404. Relative position logic 612 can determine the relative positioning based on the material transfer machine material transfer route and the material receiving machine material transfer route identified by material transfer location logic 610, based on fill strategy, and based on travel speed data. Additionally, relative position logic 612 accounts for the footprint of the machines (e.g., the axle widths and the distance between the axles) to determine the ground that the machine is or will be located on or across at current or future times.

Machine slope logic 614 can identify machine slope values (e.g., material receiving machine slope values or material transfer machine slope values, or both). As used herein a machine slope value can be a slope of the ground on which the machine is positioned or will be positioned or a machine slope value can be the slope of the machine as represented by the machine orientation (e.g., pitch or roll). Thus, a side-to-side machine slope value can be the side-to-side slope of the ground (e.g., the cross (or transverse) slope or the slope of the ground transverse (e.g., orthogonal, etc.) to the direction of travel of the machine or the slope of the ground from one side of the machine to the other side of the machine) on which the machine is or will be positioned. The side-to-side slope of the ground will affect machine roll. In another example, a side-to-side machine slope value can be the side-to-side slope of the machine as represented by the detected machine roll value. Also, therefore, a front-to-back machine slope value can be the front-to-back slope of the ground (e.g., the longitudinal slope or the slope of the ground in the direction of travel or the slope of the ground from the front of the machine to the back of the machine) on which the machine is or will be positioned. The front-to-back slope of the ground will affect machine pitch. In another example, a front-to-back machine slope value can be the front-to-back slope of the machine as represented by the detected machine pitch value. Machine slope logic 614 can identify slope of a worksite at a given location, for example, based on georeferenced worksite data 602 (e.g., a topographic map). Thus, machine slope logic 614 can identify machine slope value(s) (front-to-back machine slope value(s) or side-to-side machine slope value(s), or both) corresponding to a material transfer machine 100 (e.g., material transfer machine slope value(s)) and machine slope value(s) (front-to-back machine slope value(s) or side-to-side machine slope value(s), or both) corresponding to a material receiving machine 200 (e.g., material receiving machine slope value(s)) for given times or locations during a material transfer operation, such as at future times or future locations during a material transfer operation or at a current time or current location. For example, knowing the relative positions of the machines at a given time during a material transfer operation, as identified by relative position logic 612, slope logic 614 can identify a corresponding material transfer machine slope value and a corresponding material receiving machine slope value for that given time based on the georeferenced topographic data for the locations of the machines at the given time. Machine slope logic 614 can identify machine slope values at a given location, for example, based on sensor data 605 (e.g., machine orientation sensor data generated by machine orientation sensors 322 and 422). For example, machine orientation sensors 322 may generate sensor data indicative of material transfer machine slope values, such as front-to-back material transfer machine slope values (e.g., material transfer machine pitch values) or side-to-side material transfer machine slope values (e.g., material transfer machine roll values), or both. Machine orientation sensors 422 may generate sensor data indicative of material receiving machine slope values, such as front-to-back material receiving machine slope values (e.g., material receiving machine pitch values) or side-to-side material receiving machine slope values (e.g., material receiving machine roll values), or both. Additionally, where the material receiving machine 200 includes a towing machine and a towed material receptacle (e.g., grain cart, etc.), the material receiving machine slope values may only refer to the slope of the towed material receptacle (as either represented by slope of the ground on which the towed material receptacle is or will be positioned or as represented by a detected orientation).

Comparison logic 616 compares a material transfer machine slope value to a material receiving machine slope value to determine a machine slope differential value (i.e., the value representing the difference between the material transfer machine slope value and the material receiving machine slope value). Comparison logic 616 can compare a front-to-back material transfer machine slope value to a front-to-back material receiving machine slope value to determine a front-to-back machine slope differential value. Comparison logic 616 can compare a side-to-side material transfer machine slope value to a side-to-side material receiving machine slope value to determine a side-to-side machine slope differential value.

Comparison logic 616 can then compare a machine slope differential value to a threshold machine slope differential value (e.g., a threshold machine slope differential value corresponding to the particular pair of machines, etc.). Comparison logic 616 can compare a front-to-back machine slope differential value to a threshold front-to-back machine slope differential value (e.g., a threshold front-to-back machine slope differential value corresponding to the particular pair of machines, etc.). Comparison logic 616 can compare a side-to-side machine slope differential value to a threshold side-to-side machine slope differential value (e.g., a threshold side-to-side machine slope differential value corresponding to the particular pair of machines, etc.). In this way, material transfer control system 510 can determine whether a machine slope differential value exceeds a threshold machine slope differential value, which may result in adjustment. In another example, material transfer control system 510 can determine whether a machine slope differential value is within a threshold distance of (e.g., is less or more than a threshold machine slope differential value by a threshold amount), which may result in adjustment.

Adjustment logic 618 can determine whether a material transfer operation should be adjusted based on whether a machine slope differential value exceeds or is within a threshold distance of a threshold machine slope differential value (e.g., based on a comparison of a machine slope differential value to a threshold machine slope differential value by comparison logic 616). For example, where a machine slope differential value exceeds or is within a threshold distance of a threshold machine slope differential value, adjustment logic 618 can determine that an adjustment to the material transfer operation is to be made. Adjustment logic 618 can adjust a material transfer location (e.g., a material transfer machine material transfer route or a material receiving machine material transfer route, or both) which can include one or more of adjusting a start location, adjusting an end location, adjusting a fill strategy, and adding a pause location and a resume location. The adjustment by adjustment logic 618 can include control of the machines, such as adjusting the travel speed of the machines by controlling propulsion subsystem 350 or 450, or both, adjusting the heading or steering of the machines by controlling steering subsystem 352 or 452, or both, and adjusting the operation of a material transfer subsystem 353 (e.g., changing a position of a chute and spout, turning the conveyance mechanism on or off, etc.). Examples of adjustments by adjustment logic 618 will be shown in FIGS. 7A-9B.

As can be seen, material transfer control system 510 is operable to generate outputs 621. Outputs 621 can include one or more of material transfer locations (e.g., material transfer machine material transfer routes, material receiving machine material transfer routes, etc.) identified by material transfer location logic 610, relative positions identified by relative position logic 612, machine slope values (e.g., material transfer machine slope values (front-to-back or side-to-side, or both), material receiving machine slope values (front-to-back or side-to-side, or both), etc.) identified by machine slope logic 614, comparisons, or results thereof, by comparison logic 616 (e.g., machine slope differential values, whether the slope differential value exceeds a threshold machine slope differential value, whether the machine slope differential value is within a threshold distance of a threshold machine slope differential value etc.), and adjustments by adjustment logic 618.

Outputs 621 can be obtained (e.g., received or retrieved) by controllers 334 or controllers 434, or both.

Controllers 334 can generate control signals to control one or more items of material transfer operation system 300 including one or more controllable subsystems 316 based on 621. For example, controllers 334 can generate control signals to control material transfer subsystem actuators 354 to disengage the material transfer subsystem (e.g., turn off conveyance mechanism), to activate the material transfer subsystem 353 (e.g., turn on conveyance mechanism), to extend or retract the material transfer subsystem 353 (e.g., to change a location of a chute and spout). Controllers 334 can generate control signals to control propulsion subsystem 350 (e.g., to change a travel speed of material transfer machine 100). Controllers 334 can generate control signals to control steering subsystem 352 (e.g., to change a travel direction or route of material transfer machine 100). Controllers 334 can generate control signals control one or more interfaces (e.g., 318 or 364, or both) to provide an indication (e.g., display, audible output, haptic output, etc.) based on or indicative of an output 621.

Controllers 434 can generate control signals to control one or more items of material transfer operation system 300 including one or more controllable subsystems 416 based on an output 621. Controllers 434 can generate control signals to control propulsion subsystem 450 (e.g., to change a travel speed of material transfer machine 200). Controllers 434 can generate control signals to control steering subsystem 452 (e.g., to change a travel direction or route of material receiving machine 200). Controllers 434 can generate control signals control one or more interfaces (e.g., 418 or 364, or both) to provide an indication (e.g., display, audible output, haptic output, etc.) based on or indicative of an output 621.

FIG. 6 is a diagrammatic view illustrating one example operation of material transfer control system 510. As illustrated in FIG. 6, material transfer control system 510 has identified a material transfer machine route 702 and a material receiving machine route 704. Further, material transfer control system 510 has identified material transfer locations including a material transfer machine material transfer route 706 (represented by dashed lines along route 702) and a material receiving machine material transfer route 708 (represented by dashed lines along route 704). The material transfer machine material transfer route 706 extends from a start location to an end location 712. The material receiving machine material transfer route 708 extends from a start location 714 to an end location 716. As can be seen the end and start locations of the material receiving machine material transfer route 708 are offset from the end and start locations of the material transfer machine material transfer route 706 due to the fill strategy (illustratively filling the material receiving machine from a front of the material receptacle to a back of the material receptacle in FIG. 6) and machine dimensions. That is the start location 710 is further forward than the start location 714 and the end location 712 is further back than the end location 716 due to the fill strategy and machine dimensions.

As further illustrated in FIG. 6, material transfer control system 510 has identified a given time in the material transfer operation, at which a machine slope differential value exceeds a threshold machine slope differential value. The relative positions of the machines at the given time are represented by 718 and 720. At the given time, when material receiving machine 200 is at location 720 and material transfer machine 100 is at location 718, a machine slope differential value (e.g., a front-to-back machine slope differential value or a side-to-side machine slope differential value, or both) exceeds a threshold machine slope differential value.

Figure 7A:
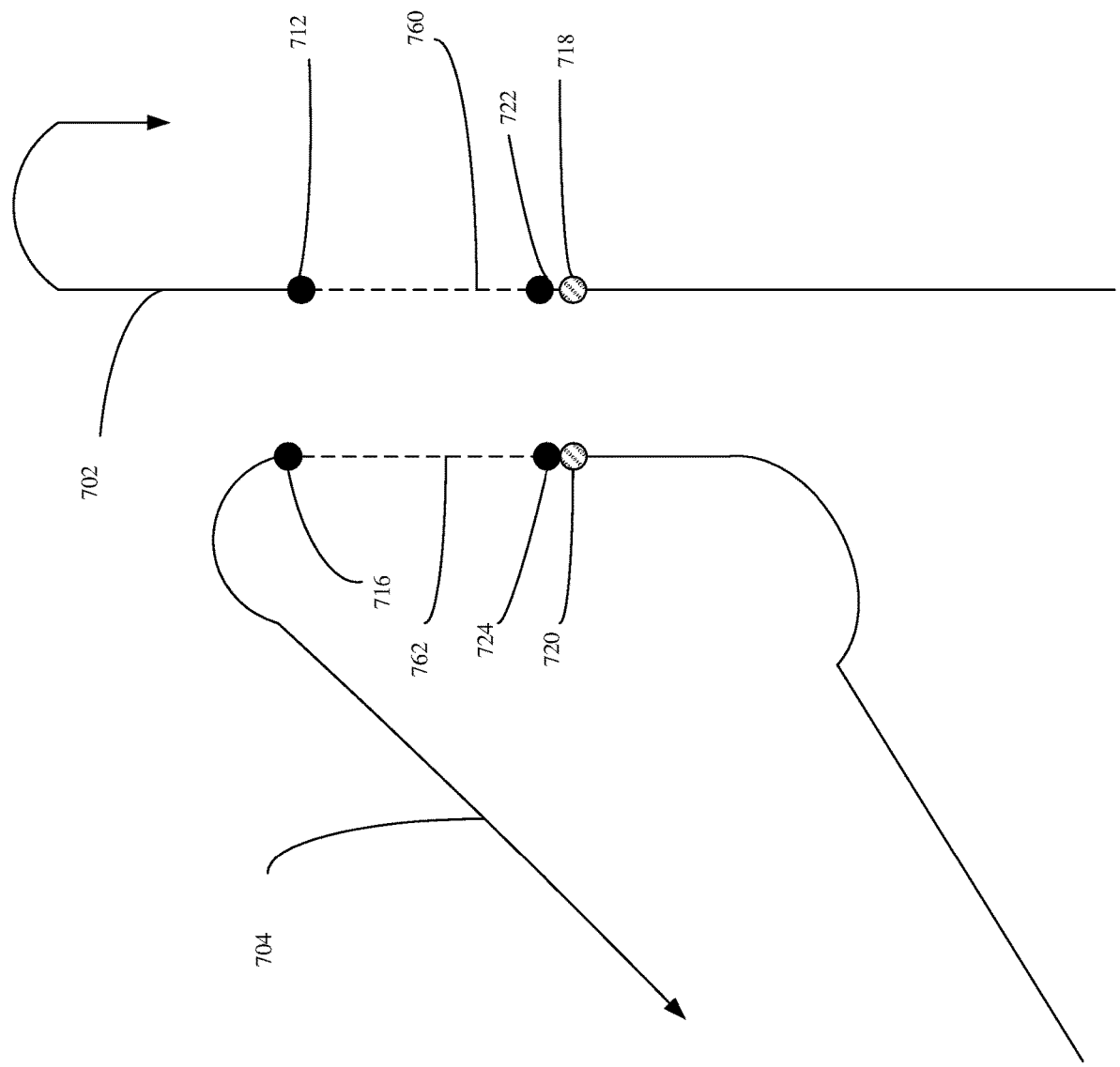
FIGS. 7A-9B are diagrammatic views showing example operations of material transfer control system.

FIG. 7A is a diagrammatic view illustrating one example operation of material transfer control system 510. The example shown in FIG. 7A represents one example adjustment made by material transfer control system 510 in response to a threshold machine slope differential value being exceeded, as shown in FIG. 6.

In FIG. 7A, it can be seen that material transfer control system 510 has adjusted the material transfer location in order to avoid material transfer at the locations 718 and 720. As can be seen in FIG. 7A, material transfer control system 510 has generated adjusted start locations (as represented by 722 and 724) such that the material transfer operation begins and thus, takes place after the locations 718 and 720. The adjustments to the start locations result in an adjusted material transfer machine material transfer route 760 and in an adjusted material receiving machine transfer route 762.

Figure 7B:
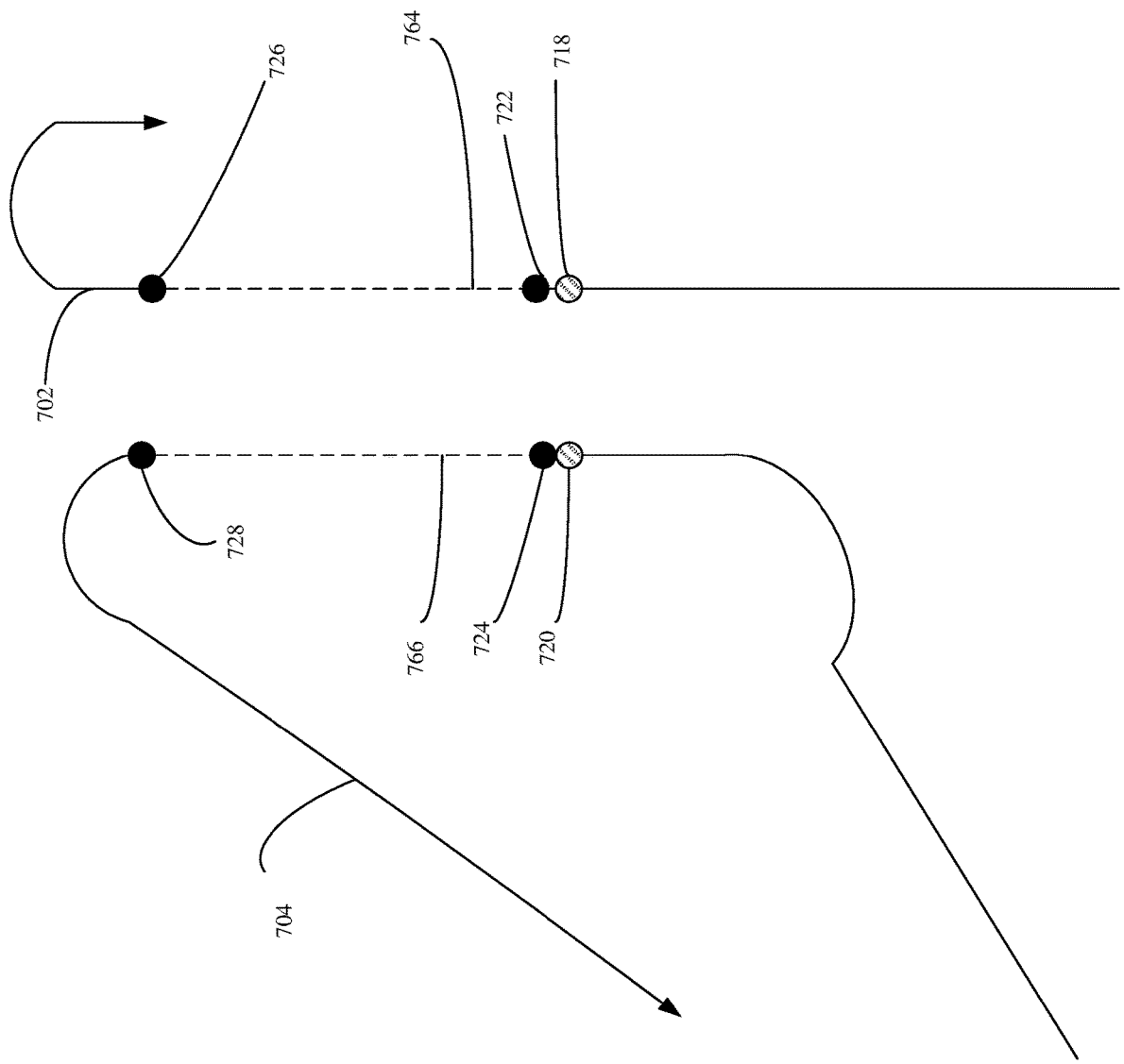

As illustrated, the start locations can be adjusted without adjusting the end locations. In such an example, the amount of material transferred may be decreased. In other examples, the amount of material transferred can be kept the same or approximately the same by adjusting the travel speeds of the machines. In yet other examples, the end locations may also be changed, as illustrated in FIG. 7B. Additionally adjusting the end locations can help allow transfer of a desired amount of material without changing the travel speed of the machines. In other examples, the end locations can be changed or kept the same and the travel of machines can be slowed or stopped at the end locations to finish the material transfer operation (e.g., transfer a desired amount of material), and thus, the end locations can become stop locations.

Additionally, the adjusted start location (724) for the material receiving machine material transfer route 708 can also result in (or allow for) a change in the route 704. As illustrated in FIG. 7A, the route 704 has been changed to change the approach of the material receiving machine 200 to the adjusted start location 724, however, this need not be the case.

FIG. 7B is a diagrammatic view illustrating one example operation of material transfer control system 510. The example shown in FIG. 7B represents one example adjustment made by material transfer control system 510 in response to a threshold machine slope differential value being exceeded, as shown in FIG. 6. FIG. 7B is similar to FIG. 7A except that the end locations have also been adjusted, as represented by 726 and 728. The adjustments to the end locations result in an adjusted material transfer machine material transfer route 764 and in an adjusted material receiving machine transfer route 766. The change to the adjusted end location 728 of material receiving machine material transfer route 708 has resulted in a change to the route (a change in the departure of material receiving machine 200).

Figure 8A:
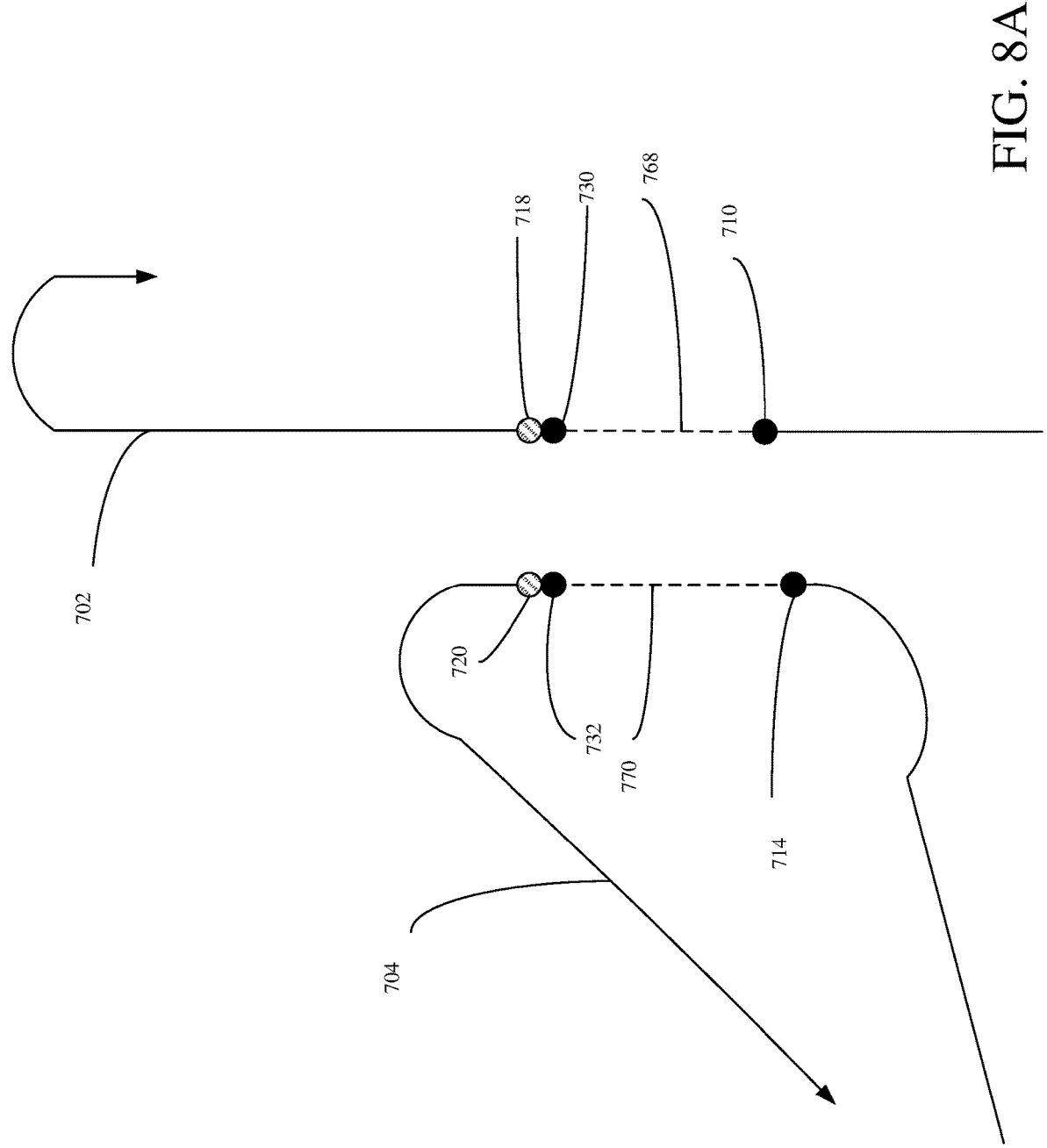

FIG. 8A is a diagrammatic view illustrating one example operation of material transfer control system 510. The example shown in FIG. 8A represents one example adjustment made by material transfer control system 510 in response to a threshold machine slope differential value being exceeded, as shown in FIG. 6.

In FIG. 8A, it can be seen that material transfer control system 510 has adjusted the material transfer location in order to avoid material transfer at the locations 718 and 720. As can be seen in FIG. 8A, material transfer control system has generated adjusted end locations (as represented by 730 and 732) such that the material transfer operation ends before the locations 718 and 720. The adjustments to the end locations result in an adjusted material transfer machine material transfer route 768 and in an adjusted material receiving machine transfer route 770.

Figure 8B:
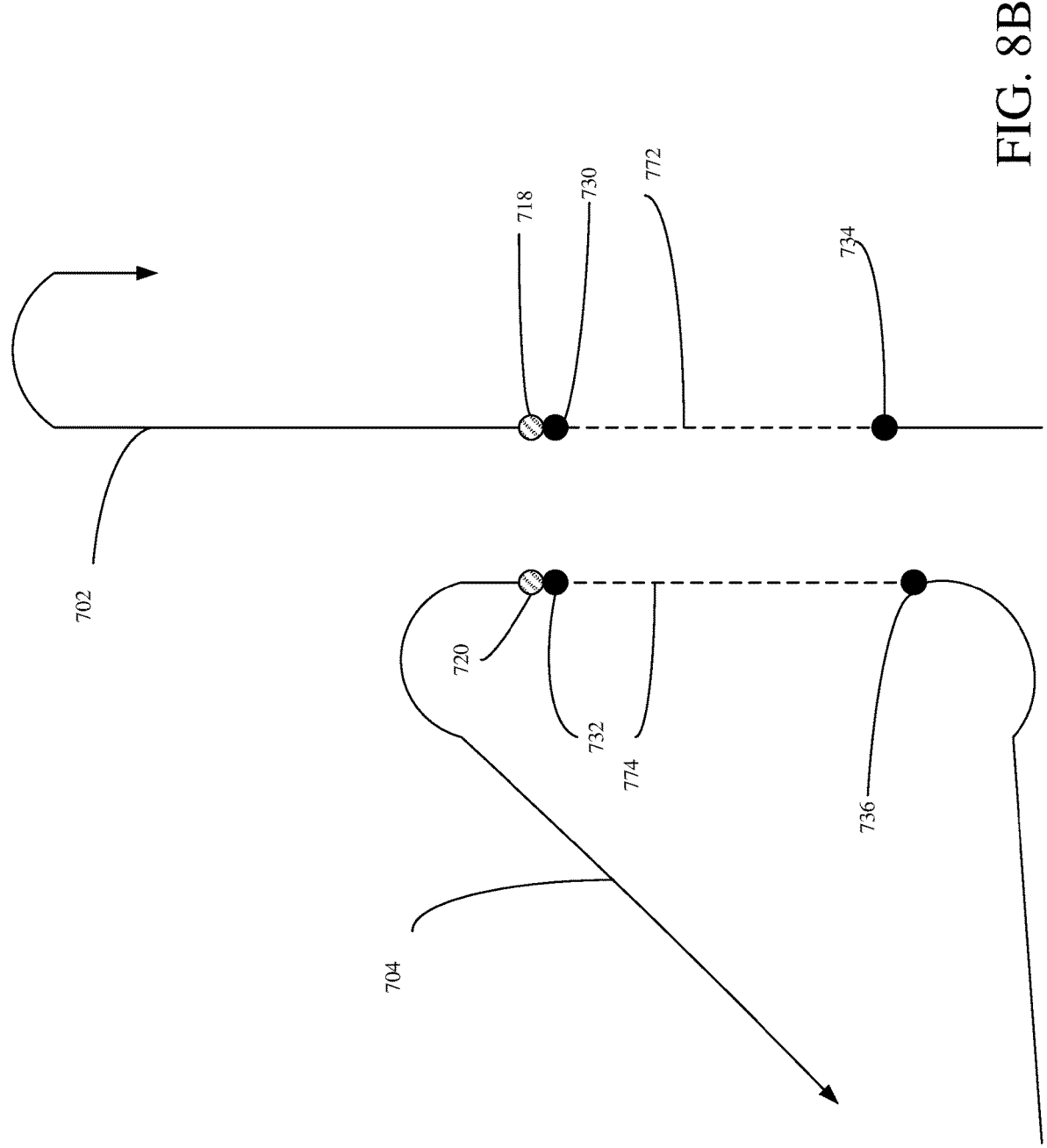

As illustrated, the end locations can be adjusted without adjusting the start locations. In such an example, the amount of material transferred may be decreased. In other examples, the amount of material transferred can be kept the same or approximately the same by adjusting the travel speeds of the machines. In yet other examples, the start locations may also be changed, as illustrated in FIG. 8B. Additionally adjusting the start locations can help allow transfer of a desired amount of material without changing the travel speed of the machines. In other examples, the start locations can be changed or kept the same and the travel of machines can be slowed or stopped at the end locations to finish the material transfer operation (e.g., transfer a desired amount of material), and thus, the end locations can become stop locations.

Additionally, the adjusted end location (732) for the material receiving machine material transfer route 708 can also result in (or allow for) a change in the route 704. As illustrated in FIG. 8A, the route 704 has been changed to change the departure of the material receiving machine 200 given the adjusted end location 732, however, this need not be the case.

FIG. 8B is a diagrammatic view illustrating one example operation of material transfer control system 510. The example shown in FIG. 8B represents one example adjustment made by material transfer control system 510 in response to a threshold machine slope differential value being exceeded, as shown in FIG. 6. FIG. 8B is similar to FIG. 8A except that the start locations have also been adjusted, as represented by 734 and 736. The adjustments to the start locations result in an adjusted material transfer machine material transfer route 772 and in an adjusted material receiving machine transfer route 774. The change to the adjusted start location of material receiving machine material transfer route 708 has resulted in a change to the route 704 (a change in the approach of material receiving machine 200).

Figure 9A:
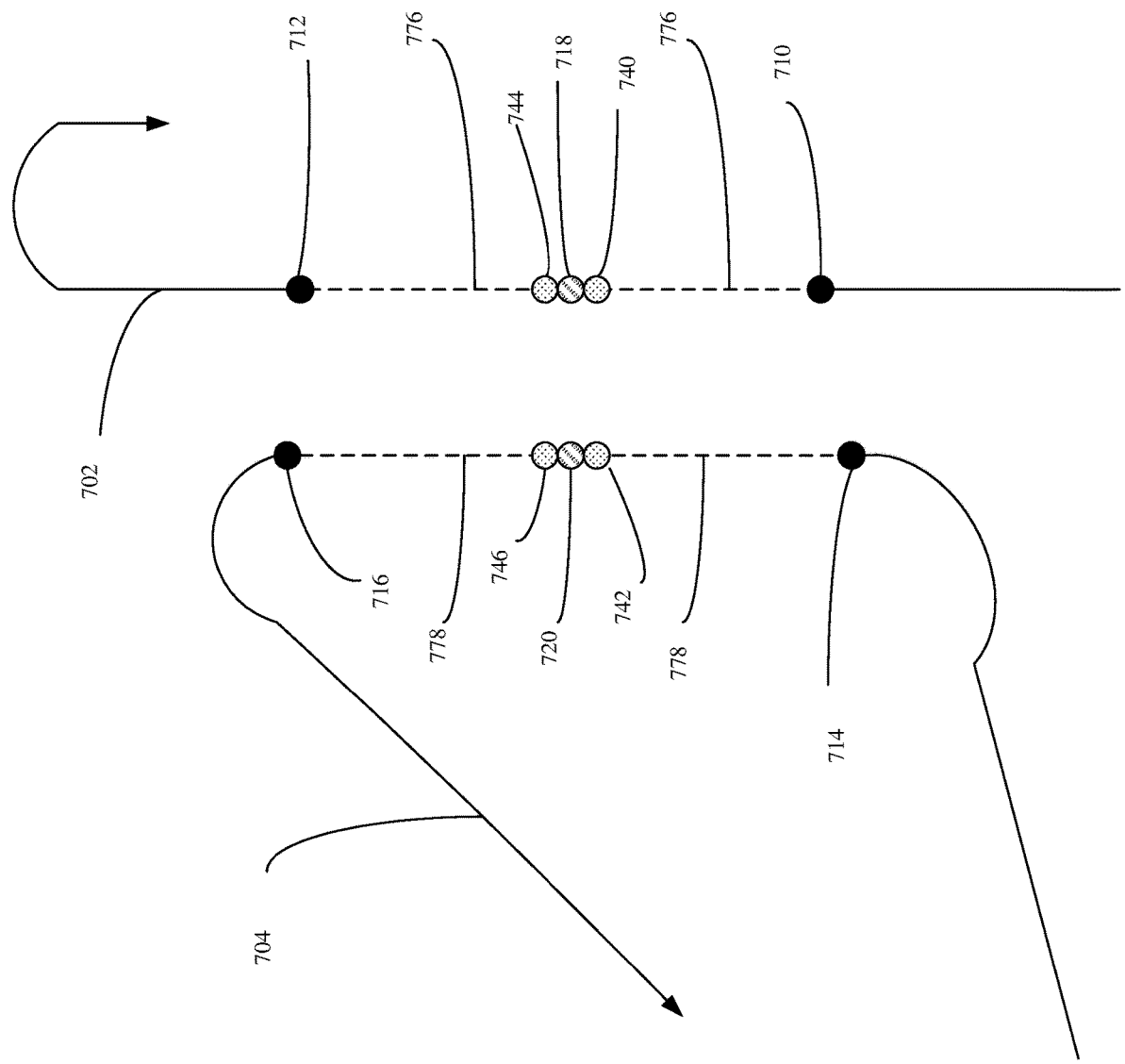

FIG. 9A is a diagrammatic view illustrating one example operation of material transfer control system 510. The example shown in FIG. 9A represents one example adjustment made by material transfer control system 510 in response to a threshold machine slope differential value being exceeded, as shown in FIG. 6.

In FIG. 9A, it can be seen that material transfer control system 510 added pause locations 740 and 742 and resume locations 744 and 746 in order to avoid material transfer at the locations 718 and 720. As can be seen in FIG. 9A, material transfer control system 510 has added pause locations 740 and 742 such that material transfer is paused prior to locations 718 and 720 and has added resume locations 744 and 746 such that material transfer does not resume until after passing locations 718 and 720. The adjustments by way of addition of pause and resume locations result in an adjusted material transfer machine material transfer route 776 and in an adjusted material receiving machine transfer route 778.

The material receiving machine 100 will be controlled such that material transfer is paused at pause location and will be controlled such that material transfer is resumed at resume location 744. For example, controllers 334 can control one or more actuators 354 of material transfer subsystem 353 to turn off the conveyance mechanism such that material transfer does not occur at the pause location 740 and can also control one or more actuators 354 of material transfer subsystem 353 to move (e.g., retract) the chute and spout. Controllers 334 can then control one or more actuators 354 of material transfer subsystem 353 to turn on the conveyance mechanism such that material transfer resumes at the resume location 744 and can also (in the case where the chute and spout were moved (e.g., retracted)) control one or more actuators 354 of material transfer subsystem 353 to move (e.g., extend) the chute and spout. In other examples, instead of retracting and extending the material transfer subsystem 353, the travel speed of the material transfer machine 100 or the travel speed of the material receiving machine 200, or both, can be adjusted such that material transfer machine 100 is not at location 718 at the same time that material receiving machine 200 is at the location 720.

Figure 9B:
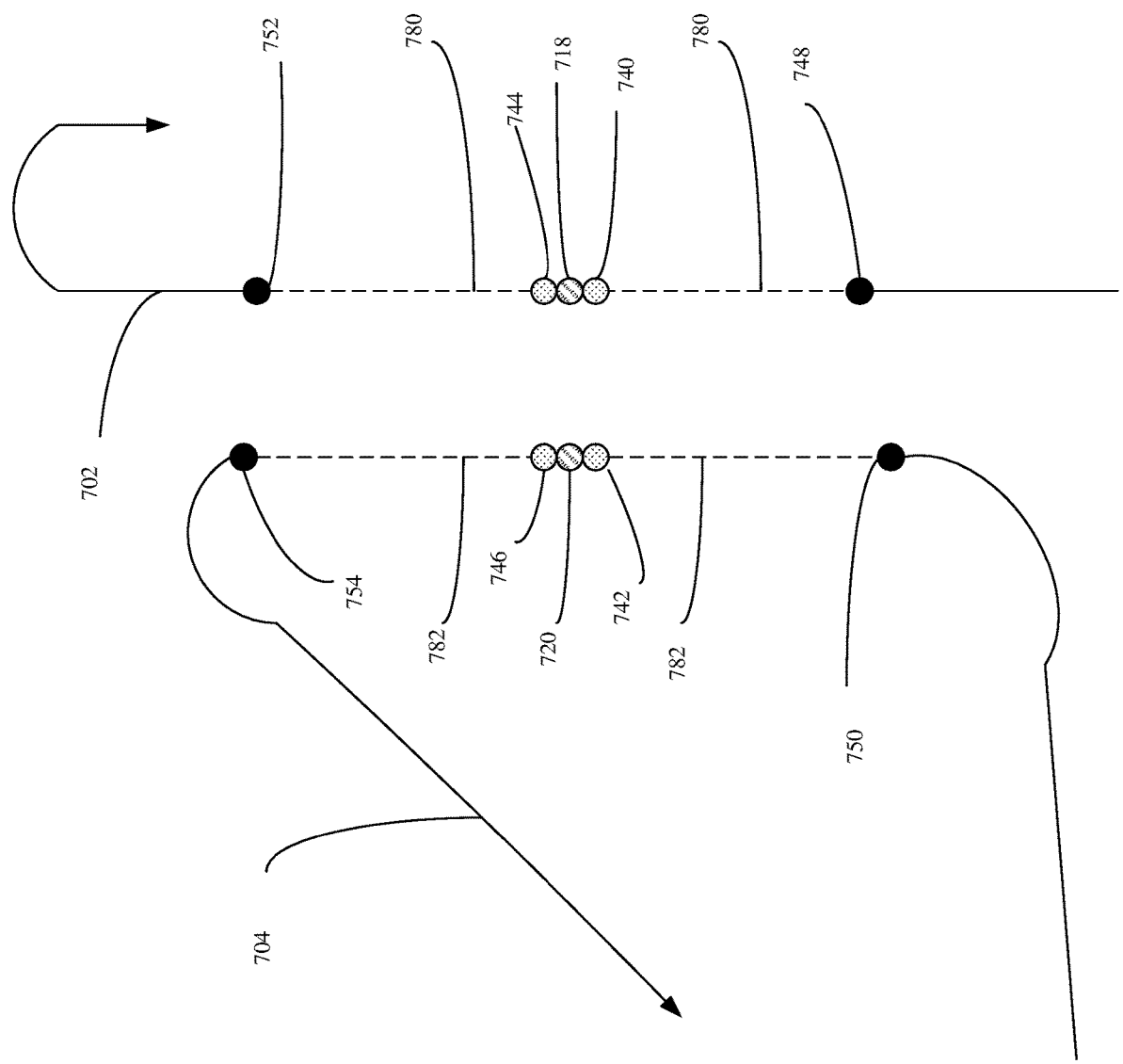

As illustrated, pause and resume locations can be added without adjusting start and end locations. In such an example, the amount of material transferred may be decreased. In other examples, the amount of material transferred can be kept the same or approximately the same by adjusting the travel speeds of the machines, such as before the pause locations or after the resume locations, or both. In yet other examples, the start locations or the end locations, or both may be adjusted, as illustrated in FIG. 9B. Additionally adjusting the start locations or the end locations, or both, can help allow transfer of a desired amount of material without changing the travel speed of the machines. In other examples, the end locations or start location can be changed or kept the same and the travel of machines can be slowed or stopped at the end locations to finish the material transfer operation (e.g., transfer a desired amount of material), and thus, the end locations can become stop locations.

FIG. 9B is a diagrammatic view illustrating one example operation of material transfer control system 510. The example shown in FIG. 9B represents one example adjustment made by material transfer control system 510 in response to a threshold machine slope differential value being exceeded, as shown in FIG. 6. FIG. 9B is similar to FIG. 9A except that the start locations and end locations have also been adjusted resulting in adjusted start locations 748 and 750 and adjusted end locations 752 and 754. The adjustments to the start and end locations result in an adjusted material transfer machine material transfer route 780 and in an adjusted material receiving machine transfer route 782. The change to the adjusted start location 750 of material receiving machine material transfer route 708 has resulted in a change to the route 704 (a change in the approach of material receiving machine 200) and the change to the adjusted end location 754 of material receiving machine transfer route 708 has resulted in a change to the route 704 (a change in the departure of material receiving machine 200).

While the examples shown in FIGS. 6-9B describe predictive operation and planning of material transfer control system 510, it will be understood that material transfer control system 510 can also adjust material transfer operation, as the material transfer operation is underway, based on machine slope values representing current machine slope values, as detected by machine orientation sensors. For example, where a current machine slope differential value (as determined by comparison logic 516) exceeds or is within a threshold distance of a threshold machine slope differential value, and adjustment can be made by material transfer control system 510, such as adding a pause and resume location. Such adjustments can include controlling the controllable subsystem 353 to stop the conveying mechanism and retracting the chute and spout and to restart the conveying mechanism and extending the chute and spout. The conveying mechanism might be restarted, and the chute and spout might be extended once the current machine slope differential value satisfies the threshold machine slope differential value.

Figure 10:
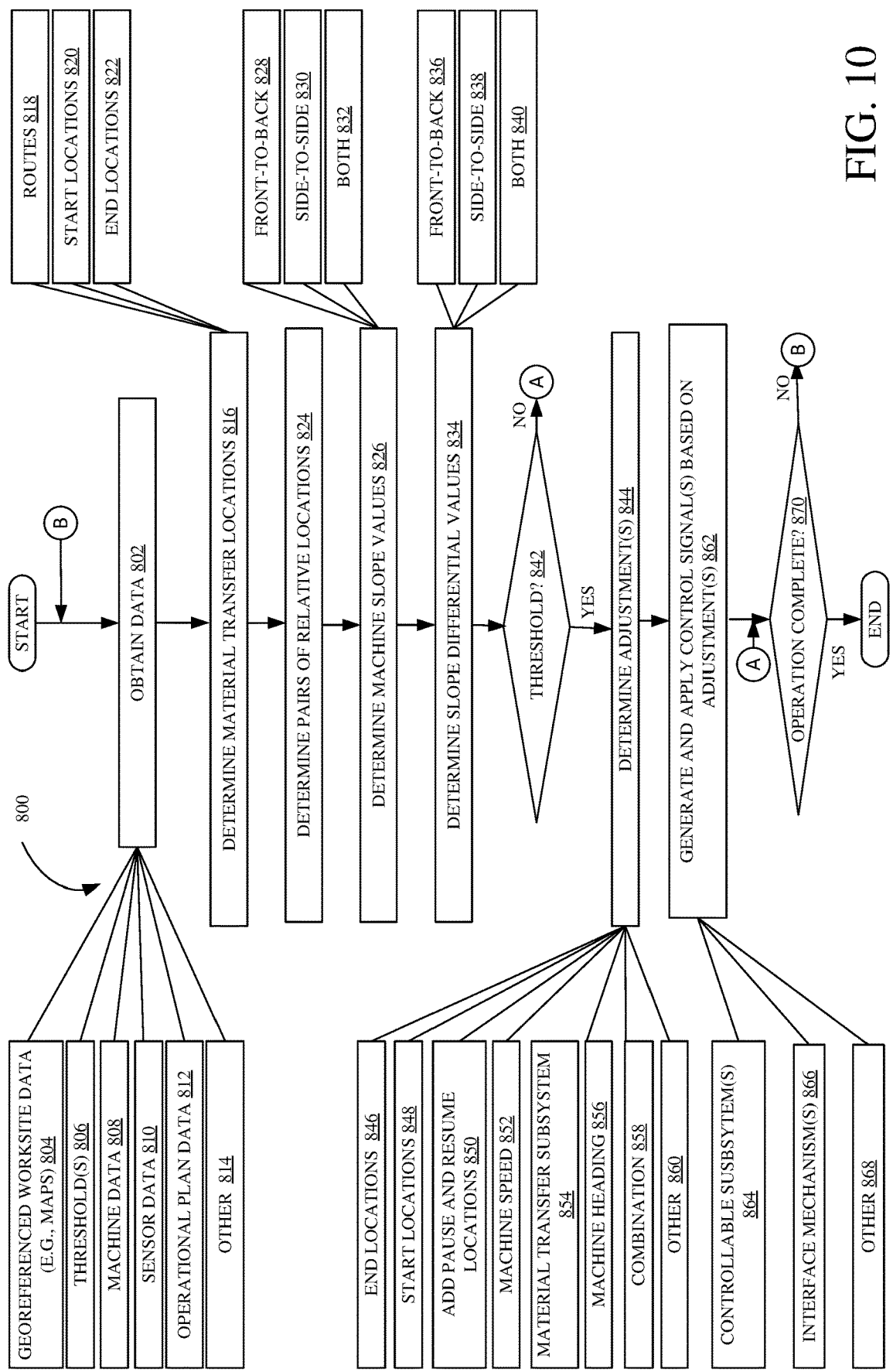
FIG. 10 is a flow chart illustrating one example of operation of material transfer operation system in controlling a material transfer operation.

FIG. 10 is a flowchart showing one example operation 800 of material transfer control system 510. It will be understood that operation 800 can occur during the course of a material transfer operation or prior to a material transfer operation.

Operation 800 begins at block 802 where one or more items of data are obtained (e.g., retrieved or received) by material transfer control system 510. As indicated by block 804, georeferenced worksite data 602 can be obtained. One or more thresholds 603 can be obtained, as indicated by block 806. Machine data 604 can be obtained, as indicated by block 808. Sensor data 605 can be obtained, as indicated by block 810. Operational plan data 606 can be obtained, as indicated by block 812. Various other data can also be obtained, as indicated by block 814.

Operation 800 continues, as will be described below, where material transfer control system 510 generates outputs 621 based on the data obtained at block 802.

At block 816, material transfer control system 510 (e.g., material transfer location logic 610) determines material transfer locations. The material transfer locations can include routes, such as a material transfer machine material transfer route and a material receiving machine material transfer route, as indicated by block 818. The material transfer routes can include start locations, as indicated by block 820, and end locations, as indicated by block 822.

At block 824, material transfer control system 510 (e.g., relative locations logic 612) determines one or more pairs of relative locations along the material transfer routes. Each pair of relative locations includes a material transfer machine location indicative of a location of a material transfer machine 100 along the material transfer machine material transfer route at a given time (e.g., a current time or a future time) and includes a material receiving machine location indicative of a location of a material receiving machine 200 along the material receiving machine material transfer route at the given time (e.g., at the current time or at the future time).

At block 826, material transfer control system 510 (e.g., machine slope logic 614) determines machine slope values corresponding to each the material transfer machine 100 and the material receiving machine 200 for each pair of relative locations. Thus, for each pair of relative locations, material transfer control system 510 can identify a front-to-back material transfer machine slope value and a front-to-back material receiving machine slope value, as indicated by block 828. For each pair of relative locations, material transfer control system 510 can identify a side-to-side material transfer machine slope value and a side-to-side material receiving machine slope value, as indicated by block 830. In some examples, material transfer control system 510 can identify both front-to-back and side-to-side slope values for each machine at each pair of relative locations, as indicated by block 832.

At block 834, material transfer control system 510 (e.g., comparison logic 616) determines a machine slope differential value for each pair of relative locations by comparing a material transfer machine slope value (corresponding to a given pair of relative locations) to a material receiving machine slope value (corresponding to the given pair of relative locations). As indicated by block 836, a front-to-back machine slope differential value can be determined based upon a comparison of a front-to-back material transfer machine slope value to a corresponding front-to-back material receiving machine slope value. As indicated by block 838, a side-to-side machine slope differential value can be determined based upon a comparison of a side-to-side material transfer machine slope value to a corresponding side-to-side material receiving machine slope value. As indicated by block 840, both front-to-back and side-to-side machine slope differential values can be determined.

In one example, at block 842, it is determined, for each pair of relative locations, if a machine slope differential value exceeds a threshold machine slope differential value. For example, for each pair of relative locations, it can be determined if a front-to-back machine slope differential value exceeds a threshold front-to-back machine slope differential value or it can be determined if a side-to-side machine slope differential value exceeds a threshold side-to-side machine slope differential value, or both. In another example, at block 842, it is determined for each pair of relative locations, if a machine slope differential value is within a threshold distance of a threshold machine slope differential value. For example, for each pair of relative locations, it can be determined if a front-to-back machine slope differential value is within a threshold distance of a threshold front-to-back machine slope differential value or it can be determined if a side-to-side machine slope differential value is within a threshold distance of a threshold side-to-side machine slope differential value, or both.

If, at block 842, it is determined that a threshold machine slope differential value has not been exceeded or if it is determined that a machine slope differential value is not within a threshold distance of a threshold machine slope differential value, then operation proceeds to block 870. If, at block 842, it is determined that a threshold machine slope differential value has been exceeded or if it is determined that a machine slope differential value is within a threshold distance of a threshold machine slope differential value, then operation proceeds to block 844.

At block 844, material transfer control system 510 (e.g., adjustment logic 818) determines one or more adjustments based on a determination at block 842 and based on one or more items of data obtained at block 802. As indicated by block 846, material transfer control system 510 may adjust material transfer end locations. As indicated by block 848, material transfer control system 510 may adjust material transfer start locations. As indicated by block 850, material transfer control system 510 may add pause and resume locations. As indicated by block 852, material transfer control system 510 may adjust travel speed of the material transfer machine 100 or the material receiving machine 200, or both. As indicated by block 854, material transfer control system 510 may adjust operation of the material transfer subsystem 353, such as by changing a position of a chute and spout or by controlling actuation of (e.g., activating or deactivating) a conveyance mechanism, or both. As indicated by block 856, material transfer control system 510 may control steering subsystem 352 to adjust a heading of material transfer machine 100 or control steering subsystem 452 to adjust a heading of material receiving machine 200, or both. As indicated by block 858, material transfer control system 510 may implement a combination of the adjustments listed at blocks 846, 848, 850, 852, 854, and 856. As indicated by block 860, material transfer control system 510 may implement various other adjustments.

At block 862, controllers 334 or controllers 434, or both, can generate control signals to control one or more items of material transfer operation system 300 based on the adjustments at block 844. As indicated by block 864, controllers 334 can generate control signals to control one or more controllable subsystems 316 based on the adjustments at block 844. Additionally, or alternatively, as indicated by block 864, controllers 434 can generate control signals to control one or more controllable subsystems 416 based on the adjustments at block 844.

As indicated by block 866, controllers 334 can generate control signals to control one or more interface mechanisms (e.g., 318 or 364, or both) to provide an indication (e.g., display, audible output, haptic output, etc.). Such an indication may be indicative the adjustments, or of other outputs of material transfer control system (e.g., material transfer locations (end locations, start locations, routes), pairs of relative locations, slope values, slope differential values, comparison results, etc.). Additionally, or alternatively, indicated by block 866, controllers 434 can generate control signals to control one or more interface mechanisms (e.g., 418 or 364, or both) to provide an indication (e.g., display, audible output, haptic output, etc.). Such an indication May be indicative the adjustments, or of other outputs of material transfer control system (e.g., material transfer locations (end locations, start locations, routes), pairs of relative locations, machine slope values, machine slope differential values, comparison results, etc.). One example indication can be an alert or warning indicating that a machine slope differential value exceeds or is within a threshold distance of a threshold machine slope differential value.

As indicated by block 868, controllers 334 or controllers 434, or both, can generate control signals to control various other items of material transfer operation system 300.

Operation 800 proceeds to block 870 where it is determined if the operation at the worksite is complete. If it is determined that the operation at the worksite is not yet complete, then operation 800 returns to block 802. If it is determined that the operation at the worksite is complete, then operation 800 ends.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores May be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, logic, controllers, components, and interactions. It will be appreciated that any or all of such systems, logic, controllers, components, and interactions may be implemented by hardware items, such as one or more processors, one or more processors executing computer executable instructions stored in memory, memory, or other processing components, some of which are described below, that perform the functions associated with those systems, components, generators, or interactions. In addition, any or all of the systems, logic, controllers, components, and interactions may be implemented by software that is loaded into a memory and is subsequently executed by one or more processors or one or more servers or other computing component(s), as described below. Any or all of the systems, logic, controllers, components, and interactions may also be implemented by different combinations of hardware, software, firmware, etc., some examples of which are described below. These are some examples of different structures that May be used to implement any or all of the systems, logic, controllers, components, and interactions described above. Other structures may be used as well.

Figure 11:
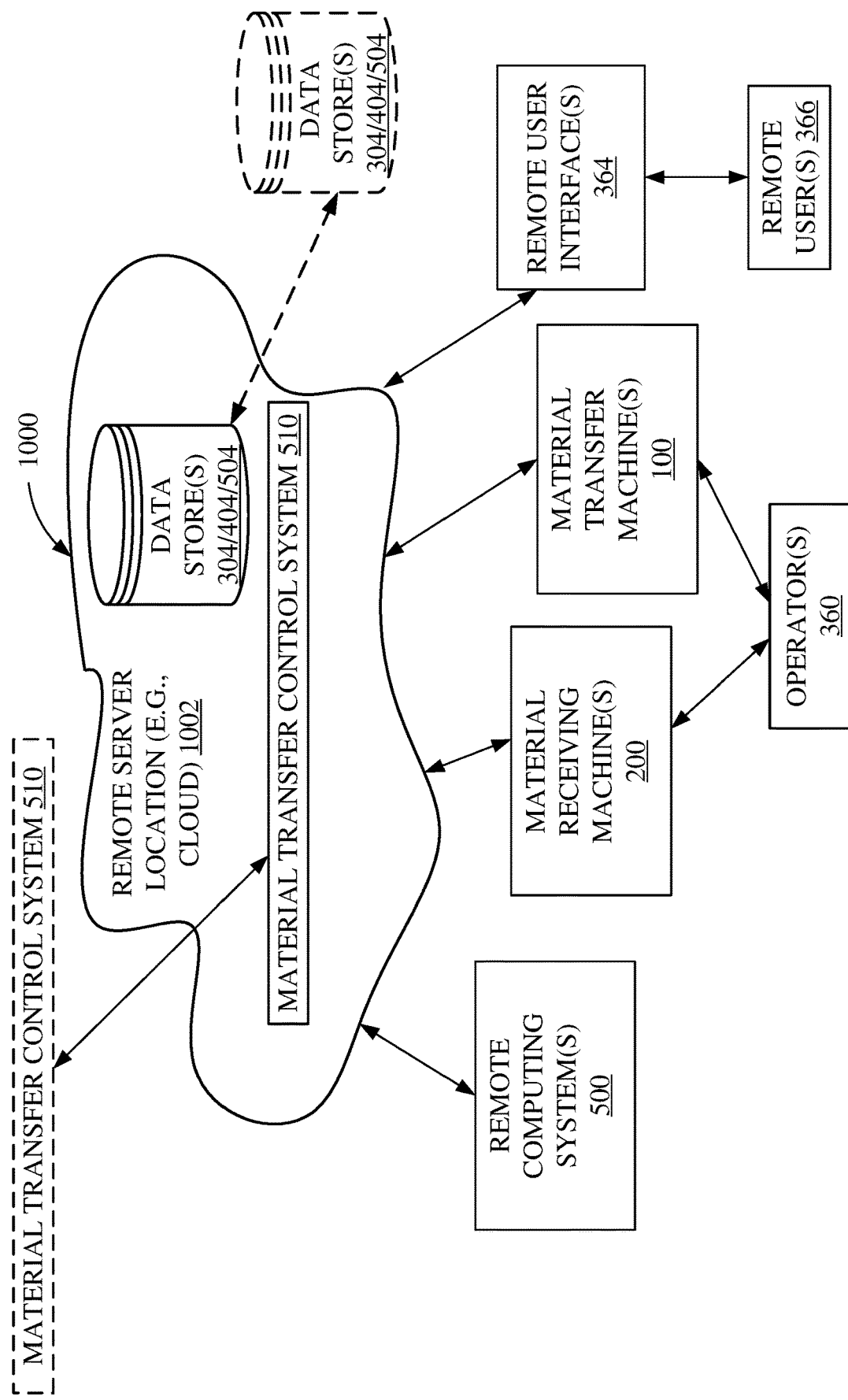
FIG. 11 is a block diagram showing one example of items of a material transfer operation system architecture in communication with a remote server architecture.

FIG. 11 is a block diagram of a remote server architecture 1000. FIG. 11, also shows one or more material transfer machines 100, one or more material receiving machines 200, one or more remote computing systems 500, and one or more remote user interface mechanisms 364 in communication with the remote server environment. The material transfer machines 100, material receiving machines 200, remote computing systems 500, and remote user interface mechanisms 364 communicate with elements in a remote server architecture 1000. In some examples, remote server architecture 1000 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in previous figures as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 11, some items are similar to those shown in previous figures and those items are similarly numbered. FIG. 11 specifically shows that material transfer control system 510, and one or more of data stores 304, data stores 404, and data stores 504, May be located at a server location 1002 that is remote from the material transfer machines 100, material receiving machines 200, remote computing systems 500, and remote user interface mechanisms 364. Therefore, in the example shown in FIG. 11, material transfer machines 100, material receiving machines 200, remote computing systems 500, and remote user interface mechanisms access systems through remote server location 1002. In other examples, various other items may also be located at server location 1002, such as various other items of material transfer operation system architecture 300.

FIG. 11 also depicts another example of a remote server architecture. FIG. 11 shows that some elements of previous figures may be disposed at a remote server location (e.g., cloud) while others may be located elsewhere. By way of example, one or more of data store(s) 304, 404, and 504 may be disposed at a location separate from location 1002 and accessed via the remote server at location 1002. Similarly, material transfer control system 510 may be disposed at a location separate from locations 1002 and accessed via the remote server at locations 1002. Regardless of where the elements are located, the elements can be accessed directly by material transfer machines 100, material receiving machines 200, remote computing systems 500, and remote user interface mechanisms 364 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As a mobile machine (e.g., material transfer machine 100 or material receiving machine 200) comes close to the machine containing the information collection system, such as a fuel truck prior to fueling, the information collection system collects the information from the mobile machine using any type of ad-hoc wireless connection. The collected information may then be forwarded to another network when the machine containing the received information reaches a location where wireless telecommunication service coverage or other wireless coverage—is available. For instance, a fuel truck may enter an area having wireless communication coverage when traveling to a location to fuel other machines or when at a main fuel storage location. All of these architectures are contemplated herein. Further, the information may be stored on a mobile machine until the mobile machine enters an area having wireless communication coverage. The mobile machine, itself, may send the information to another network.

It will also be noted that the elements of previous figures, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 12:
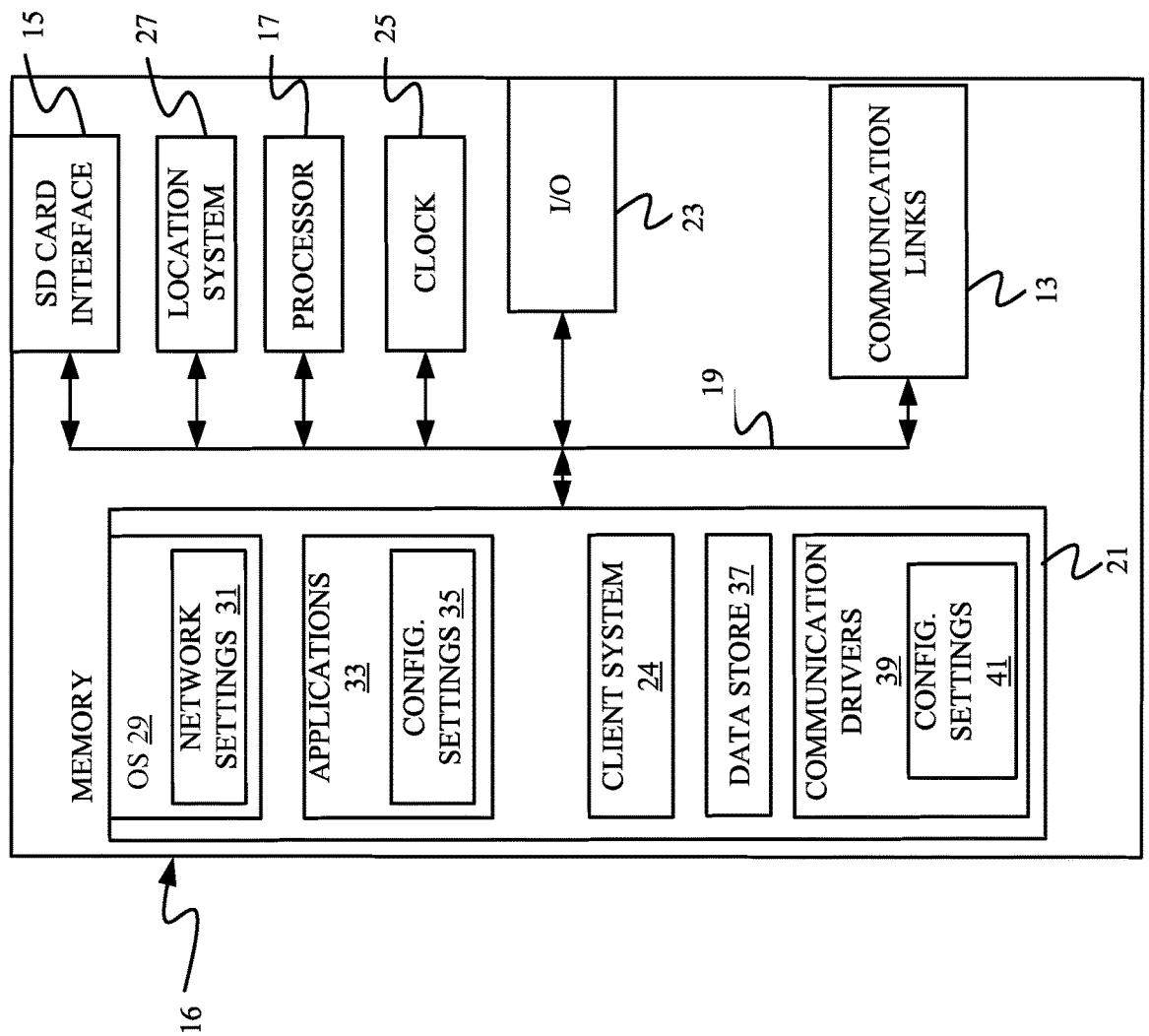
FIGS. 12-14 show examples of mobile devices that can be used in a material transfer operation system architecture.

FIG. 12 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine (e.g., a material transfer machine 100 or a material receiving machine 200, or both) for use in generating, processing, or displaying the material transfer status outputs and interlock outputs discussed above. FIGS. 16-17 are examples of handheld or mobile devices.

Figure 15:
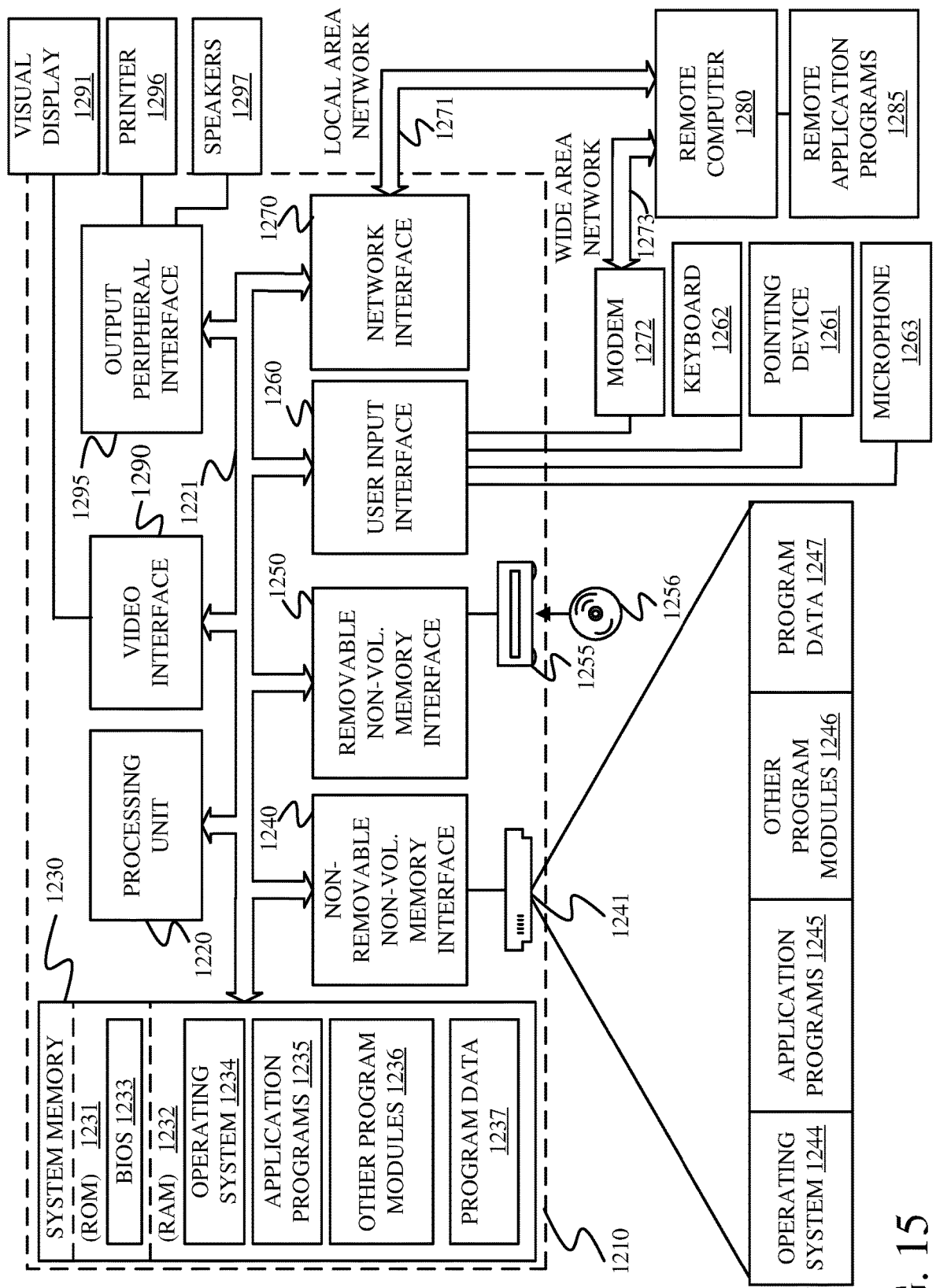
FIG. 15 is a block diagram showing one example of a computing environment that can be used in a material transfer operation system architecture.

FIG. 15 provides a general block diagram of the components of a client device 16 that can run some components shown in previous figures, that interact with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, client system 24, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

Figure 13:
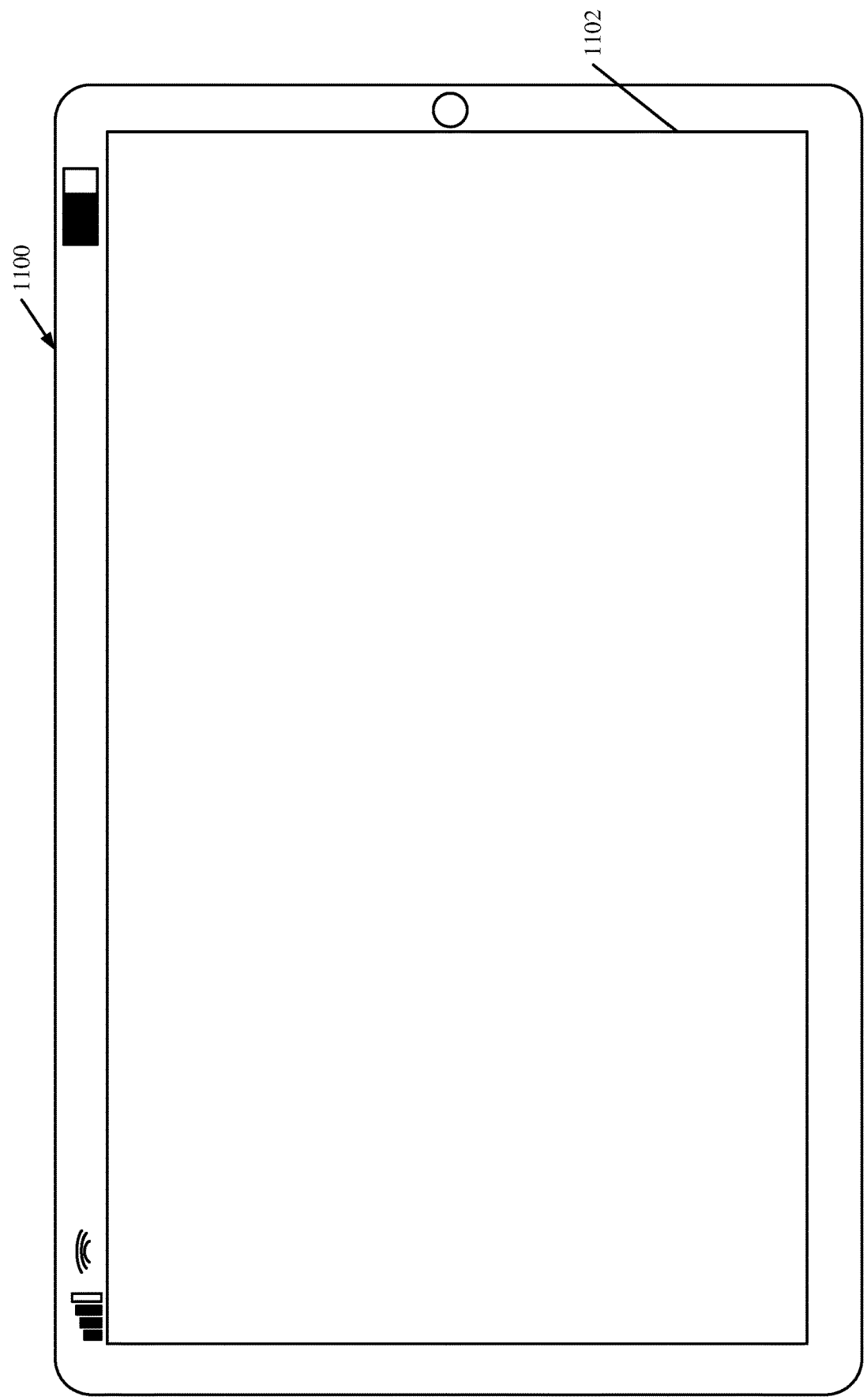

FIG. 13 shows one example in which device 16 is a tablet computer 1100. In FIG. 13, computer 1100 is shown with user interface display screen 1102. Screen 1102 can be a touch screen or a pen-enabled interface that receives inputs from a pen or stylus. Tablet computer 1100, May also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

Figure 14:
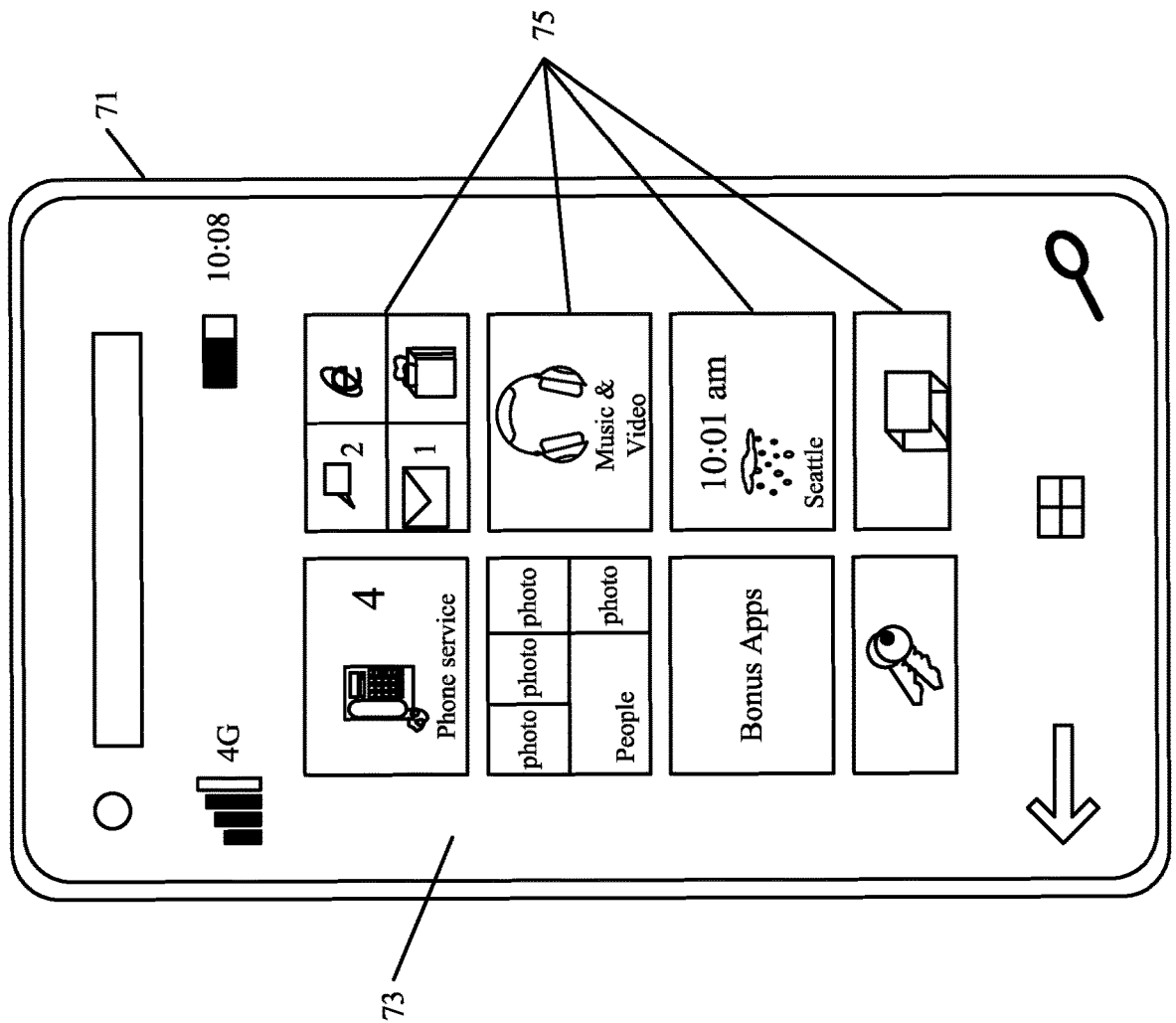

FIG. 14 is similar to FIG. 13 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 15 is one example of a computing environment in which elements of previous figures described herein can be deployed. With reference to FIG. 15, an example system for implementing some embodiments includes a computing device in the form of a computer 1210 programmed to operate as discussed above. Components of computer 1210 may include, but are not limited to, a processing unit 1220 (which can comprise processors or servers from previous figures), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures.

Memory and programs described with respect to previous figures described herein can be deployed in corresponding portions of FIG. 15.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 15 illustrates operating system 1234, application programs 1235, other program modules 1236, and program data 1237.

The computer 1210 may also include other removable/non-removable volatile/nonvolatile computer storage media. By way of example only, FIG. 15 illustrates a hard disk drive 1241 that reads from or writes to non-removable, nonvolatile magnetic media, an optical disk drive 1255, and non-volatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 1210. In FIG. 15, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also 24 connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 15 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. A material transfer operation system comprising: one or more processors;
  memory storing instructions, executable by the one or more processors, the instructions,
  when executed by the one or more processors, configuring the one or more processors to:
  identify a material transfer machine material transfer route indicative of a route along which a material transfer machine is to conduct a material transfer operation;
  identify a material receiving machine material transfer route indicative of a route along which a material receiving machine is to conduct the material transfer operation;
  identify a material transfer machine slope value corresponding to a location along the material transfer machine material transfer route;

identify a material receiving machine slope value corresponding to a location along the material receiving machine material transfer route;

compare the material transfer machine slope value to the material receiving machine slope value to determine a slope differential value;

compare the slope differential value to a threshold slope differential value; and generate an adjustment based on the comparison of the slope differential value to the threshold slope differential value control one or more of the material transfer machine and the material receiving machine based on the adjustment.

2. The material transfer operation system of claim 1, wherein the material transfer machine slope value is a front-to-back material transfer machine slope value and wherein the material receiving machine slope value is a front-to-back material receiving machine slope value.

3. The material transfer operation system of claim 1, wherein the material transfer machine slope value is a side-to-side material transfer machine slope value and wherein the material receiving machine slope value is a side-to-side material receiving machine slope value.

4. The material transfer operation system of claim 1, wherein the adjustment comprises an adjustment to one of the material transfer machine material transfer route or to the material receiving machine material transfer route.

5. The material transfer operation system of claim 4, wherein the adjustment comprises a change in a starting location for one of the material transfer machine material transfer route or the material receiving machine material transfer route.

6. The material transfer operation system of claim 4, wherein the adjustment comprises a change in an end location for one of the material transfer machine material transfer route or the material receiving machine material transfer route.

7. The material transfer operation system of claim 4, wherein the adjustment comprises at least one of a pause location and a resume location added to one of the material transfer machine material transfer route or the material receiving machine material transfer route.

8. The material transfer operation system of claim 1, wherein the instructions that, when executed by the one or more processors, configure the one or more processors to control the one or more of the material transfer machine and the material receiving machine based on the adjustment include instructions that, when executed by the one or more processors, configure the one or more processors to control the one or more of the material transfer machine and the material receiving machine by controlling one or more of a propulsion subsystem of the material transfer machine and a propulsion subsystem of the material receiving machine based on the adjustment.

9. The material transfer operation system of claim 1, wherein the instructions that, when executed by the one or more processors, configure the one or more processors to control the one or more of the material transfer machine and the material receiving machine based on the adjustment include instructions that, when executed by the one or more processors, configure the one or more processors to control the one or more of the material transfer machine and the material receiving machine by controlling a material transfer subsystem of the material transfer machine based on the adjustment.

10. A computer implemented method of controlling a material transfer operation, the computer implemented method comprising:

identifying a material transfer machine material transfer route indicative of a route along which a material transfer machine is to conduct the material transfer operation;

identifying a material receiving machine material transfer route indicative of a route along which a material receiving machine is to conduct the material transfer operation;

identifying a material transfer machine slope value corresponding a location along the material transfer machine material transfer route;

identifying a material receiving machine slope value corresponding to a location along the material receiving machine material transfer route;

identifying a slope differential value indicative of a difference between the material transfer machine slope and the material receiving machine slope;

generating an adjustment based on the identified slope differential value; and controlling one or more of the material transfer machine and the material receiving machine based on the adjustment.

11. The computer implemented method of claim 10 and further comprising:

comparing the identified slope differential value to a threshold slope differential value; and generating the adjustment based on the comparison of the identified slope differential value to the threshold slope differential value.

12. The computer implemented method of claim 10, wherein generating the adjustment comprises generating, as the adjustment, an adjustment to one or more of a starting location of one or more of the material transfer machine material transfer route and a starting location of the material receiving machine material transfer route.

13. The computer implemented method of claim 10, wherein generating the adjustment comprises generating, as the adjustment, an adjustment to one or more of an end location of the material transfer machine material transfer route and an end location of the material receiving machine material transfer route.

14. The computer implemented method of claim 10, wherein generating the adjustment comprises generating, as the adjustment, at least one of a pause location and a resume location added to one or more of the material transfer machine material transfer route and the material receiving machine material transfer route.

15. The computer implemented method of claim 10, wherein controlling one or more of the material transfer machine and the material receiving machine based on the adjustment comprises controlling one or more of a controllable subsystem of the material transfer machine and a controllable subsystem of the material receiving machine based on the adjustment.

16. The computer implemented method of claim 10, wherein controlling one or more of the material transfer machine and the material receiving machine based on the adjustment comprises one or more of controlling a propulsion subsystem of the material transfer machine and controlling a propulsion subsystem of the material receiving machine based on the adjustment.

17. The computer implemented method of claim 10, wherein controlling one or more of the material transfer machine and the material receiving machine based on the adjustment comprises controlling a material transfer subsystem of the material transfer machine based on the adjustment.

18. The computer implemented method of claim 10, wherein identifying a material receiving machine material transfer route comprises obtaining material accumulation data, fill level data, and fill capacity data and identifying the material receiving machine material transfer route based on the obtained material accumulation data, the fill level data, and the fill capacity data.

19. A material transfer operation system comprising:

one or more processors;

memory storing instructions, executable by the one or more processors, the instructions, when executed by the one or more processors, configuring the one or more processors to:

identify a material transfer machine material transfer route indicative of a route along which a material transfer machine is to conduct a material transfer operation;

identify a material receiving machine material transfer route indicative of a route along which a material receiving machine is to conduct the material transfer operation;

identify a material transfer machine slope value corresponding a location along the material transfer machine material transfer route;

identify a material receiving machine slope value corresponding to a location along the material receiving machine material transfer route;

compare the material transfer machine slope value to the material receiving machine slope value;

identify a slope differential value based on the comparison of the material transfer machine slope value and the material receiving machine slope value;

compare the slope differential value to a threshold slope differential value; and generate an adjustment based on the identified material transfer machine slope value and the material receiving machine slope value and control one or more of the material transfer machine and the material receiving machine based on the adjustment.

* * * * *